(12) United States Patent
Alexander et al.

(10) Patent No.: US 10,534,182 B2
(45) Date of Patent: *Jan. 14, 2020

(54) OPTICAL SPLITTER FOR INTEGRATED EYE TRACKING AND SCANNING LASER PROJECTION IN WEARABLE HEADS-UP DISPLAYS

(71) Applicant: NORTH INC., Kitchener (CA)

(72) Inventors: Stefan Alexander, Elmira (CA); Jake Chapeskie, Kitchener (CA); Lloyd Frederick Holland, Kitchener (CA); Thomas Mahon, Guelph (CA)

(73) Assignee: North Inc., Kitchener, ON (CA)

( * ) Notice: Subject to any disclaimer, the term of this patent is extended or adjusted under 35 U.S.C. 154(b) by 0 days.

This patent is subject to a terminal disclaimer.

(21) Appl. No.: 16/126,564

(22) Filed: Sep. 10, 2018

(65) Prior Publication Data

US 2019/0004323 A1 Jan. 3, 2019

Related U.S. Application Data

(63) Continuation of application No. 15/807,842, filed on Nov. 9, 2017, now Pat. No. 10,139,633, which is a
(Continued)

(51) Int. Cl.
*G02B 27/01* (2006.01)
*G06F 3/01* (2006.01)
(Continued)

(52) U.S. Cl.
CPC ........... *G02B 27/0172* (2013.01); *G02B 5/32* (2013.01); *G02B 26/0833* (2013.01);
(Continued)

(58) Field of Classification Search
CPC .............. G02B 27/0172; G02B 27/017; G02B 27/0093; G02B 27/0176; G02B 27/0101; G02B 27/0149; G02B 27/01; G02B 27/0103; G02B 27/0105; G02B 27/0109; G02B 27/0138; G02B 27/014; G02B 27/0174; G02B 27/0178; G02B 5/32;
(Continued)

(56) References Cited

U.S. PATENT DOCUMENTS 5,257,094 A * 10/1993 LaRussa .................. G02B 5/32
359/13
5,334,991 A * 8/1994 Wells ...................... F16F 15/02
345/7
(Continued)

*Primary Examiner* — Darlene M Ritchie
(74) *Attorney, Agent, or Firm* — Thomas Mahon

(57) ABSTRACT

Systems, devices, and methods that integrate eye tracking capability into scanning laser projector ("SLP")-based wearable heads-up displays are described. An infrared laser diode is added to an RGB SLP and an infrared photodetector is aligned to detect reflections of the infrared light from features of the eye. A holographic optical element ("HOE") may be used to combine visible light, infrared light, and environmental light into the user's "field of view." The HOE may be heterogeneous and multiplexed to apply positive optical power to the visible light and zero or negative optical power to the infrared light.

15 Claims, 8 Drawing Sheets

Related U.S. Application Data continuation of application No. 15/167,458, filed on May 27, 2016, now Pat. No. 10,078,219.

(60) Provisional application No. 62/271,135, filed on Dec. 22, 2015, provisional application No. 62/167,767, filed on May 28, 2015.

(51) Int. Cl.
*G02B 5/32* (2006.01)
*G02B 26/08* (2006.01)
*G02B 27/00* (2006.01)
*H04N 9/31* (2006.01)

(52) U.S. Cl.
CPC ..... *G02B 27/0093* (2013.01); *G02B 27/0103* (2013.01); *G02B 27/017* (2013.01); *G02B 27/0176* (2013.01); *G06F 3/013* (2013.01); *H04N 9/3129* (2013.01); *H04N 9/3161* (2013.01); *G02B 2027/015* (2013.01); *G02B 2027/0107* (2013.01); *G02B 2027/0109* (2013.01); *G02B 2027/0174* (2013.01); *G02B 2027/0178* (2013.01)

(58) Field of Classification Search
CPC ........ G02B 26/0833; G02B 2027/0178; G02B 2027/015; G02B 2027/0174; G02B 2027/0109; G02B 2027/0123; H04N 9/3129; H04N 9/3161; G06F 3/011; G06F 3/012; G06F 3/013; G06F 3/014
See application file for complete search history.

(56) References Cited

U.S. PATENT DOCUMENTS

| | | | | |
|---|---|---|---|---|
| 8,970,571 B1* | 3/2015 | Wong | ................. | G02B 27/0101 345/207 |
| 9,223,152 B1* | 12/2015 | Kress | .................... | G01J 1/4204 |
| 10,277,874 B2* | 4/2019 | Xu | ....................... | H01S 5/06825 |
| 2001/0005285 A1* | 6/2001 | Tanaka | ................. | G02B 27/017 359/630 |
| 2002/0167462 A1* | 11/2002 | Lewis | ................ | G02B 27/0093 345/7 |
| 2005/0219668 A1* | 10/2005 | Taghizadeh | ............ | G03H 1/041 359/20 |
| 2007/0109619 A1* | 5/2007 | Eberl | ..................... | A61B 3/113 359/17 |
| 2010/0060551 A1* | 3/2010 | Sugiyama | .............. | G02B 26/06 345/8 |
| 2010/0149073 A1* | 6/2010 | Chaum | ............... | G02B 27/0093 345/8 |
| 2010/0157400 A1* | 6/2010 | Dimov | ................... | G02B 5/188 359/13 |
| 2011/0109528 A1* | 5/2011 | Mun | ................... | G02B 27/0172 345/8 |
| 2013/0077049 A1* | 3/2013 | Bohn | ....................... | G02B 5/20 351/210 |
| 2013/0182224 A1* | 7/2013 | Schwiegerling | ...... | A61B 3/1015 351/234 |
| 2013/0241907 A1* | 9/2013 | Amirparviz | ........ | G02B 27/0093 345/207 |
| 2013/0293591 A1* | 11/2013 | Miller | ...................... | G09G 3/02 345/690 |
| 2014/0035959 A1* | 2/2014 | Lapstun | ................ | G02B 26/10 345/690 |
| 2015/0145777 A1* | 5/2015 | He | ........................ | G06K 9/0061 345/158 |
| 2015/0205135 A1* | 7/2015 | Border | ............... | G02B 27/0172 359/630 |
| 2015/0362734 A1* | 12/2015 | Moser | .................. | G03H 1/0248 359/3 |
| 2016/0033771 A1* | 2/2016 | Tremblay | ............... | G02B 26/10 345/8 |
| 2016/0195721 A1* | 7/2016 | Evans | ................ | G02B 27/0172 345/8 |
| 2016/0227164 A1* | 8/2016 | Klug | .................... | G02B 5/1842 |
| 2016/0252742 A1* | 9/2016 | Wakabayashi | ..... | G02B 27/4227 345/8 |
| 2016/0267708 A1* | 9/2016 | Nistico | .............. | G02B 27/0172 |
| 2016/0291543 A1* | 10/2016 | Saito | .................... | G03H 1/0248 |
| 2017/0014026 A1* | 1/2017 | Guyton | .................. | A61B 3/113 |
| 2017/0180690 A1* | 6/2017 | Jackson | .................... | H04N 9/14 |
| 2017/0363872 A1* | 12/2017 | Border | .............. | G02B 27/0172 |
| 2018/0032136 A1* | 2/2018 | Kim | ..................... | G06F 3/013 |
| 2018/0042692 A1* | 2/2018 | Kim | ..................... | A61B 90/361 |

* cited by examiner

OPTICAL SPLITTER FOR INTEGRATED EYE TRACKING AND SCANNING LASER PROJECTION IN WEARABLE HEADS-UP DISPLAYS

TECHNICAL FIELD

The present systems, devices, and methods generally relate to scanning laser-based eye tracking technologies and particularly relate to integrating eye tracking functionality into a scanning laser projector based wearable heads-up display.

BACKGROUND

Description of the Related Art

Wearable Heads-Up Displays

A head-mounted display is an electronic device that is worn on a user's head and, when so worn, secures at least one electronic display within a viewable field of at least one of the user's eyes, regardless of the position or orientation of the user's head. A wearable heads-up display is a head-mounted display that enables the user to see displayed content but also does not prevent the user from being able to see their external environment. The "display" component of a wearable heads-up display is either transparent or at a periphery of the user's field of view so that it does not completely block the user from being able to see their external environment. Examples of wearable heads-up displays include: the Google Glass®, the Optinvent Ora®, the Epson Moverio®, and the Sony Glasstron®, just to name a few.

The optical performance of a wearable heads-up display is an important factor in its design. When it comes to face-worn devices, however, users also care a lot about aesthetics. This is clearly highlighted by the immensity of the eyeglass (including sunglass) frame industry. Independent of their performance limitations, many of the aforementioned examples of wearable heads-up displays have struggled to find traction in consumer markets because, at least in part, they lack fashion appeal. Most wearable heads-up displays presented to date employ large display components and, as a result, most wearable heads-up displays presented to date are considerably bulkier and less stylish than conventional eyeglass frames.

A challenge in the design of wearable heads-up displays is to minimize the bulk of the face-worn apparatus will still providing displayed content with sufficient visual quality. There is a need in the art for wearable heads-up displays of more aesthetically-appealing design that are capable of providing high-quality images to the user without limiting the user's ability to see their external environment.

Eye Tracking

Eye tracking is a process by which the position, orientation, and/or motion of the eye may be measured, detected, sensed, determined (collectively, "measured"), and/or monitored. The positon, orientation, and/or motion of the eye may be measured in a variety of different ways, the least invasive of which typically employ one or more optical sensor(s) (e.g., cameras) to optically track the eye. Common techniques involve illuminating or flooding the entire eye, all at once, with infrared light and measuring reflections with at least one optical sensor that is tuned to be sensitive to the infrared light. Information about how the infrared light is reflected from the eye is analyzed to determine the position(s), orientation(s), and/or motion(s) of one or more eye feature(s) such as the cornea, pupil, iris, and/or retinal blood vessels.

Eye tracking functionality is highly advantageous in applications of wearable heads-up displays. Some examples of the utility of eye tracking in wearable heads-up displays include: influencing where content is displayed in the user's field of view, conserving power by not displaying content that is outside of the user's field of view, influencing what content is displayed to the user, determining where the user is looking, determining whether the user is looking at displayed content on the display or through the display at their external environment, and providing a means through which the user may control/interact with displayed content. However, incorporating eye tracking functionality in a wearable heads-up display conventionally adds unwanted bulk to the system. Eye tracking systems available today generally implement multiple dedicated components with very stringent positioning requirements which undesirably increase the overall size and form factor of the system when incorporated into a wearable heads-up display. There is a need in the art for systems, devices, and methods of eye tracking that can integrate into wearable heads-up displays with minimal effect on the size and form factor of the system.

BRIEF SUMMARY

A laser projector with an integrated eye tracker may be summarized as including: a laser module including an infrared laser diode to output an infrared light and at least one visible light laser diode to output a visible light; a scan mirror aligned with an output of the laser module to receive both the infrared light and the visible light and to controllably reflect both the infrared light and the visible light; a wavelength-multiplexed holographic optical element aligned to receive both the infrared light and the visible light reflected from the scan mirror and to redirect both the infrared light and the visible light towards an eye of a user, wherein the wavelength-multiplexed holographic optical element includes a first hologram that is responsive to the visible light and unresponsive to the infrared light and a second hologram that is responsive to the infrared light and unresponsive to the visible light; and an infrared detector aligned to receive at least a portion of infrared light reflected from the eye of the user. The wavelength-multiplexed holographic optical element may comprise at least two distinct layers of holographic material, a first layer of holographic material that includes the first hologram and a second layer of holographic material that includes the second hologram. Alternatively, the wavelength-multiplexed holographic optical element may comprise a single volume of holographic material that includes both the first hologram and the second hologram. The at least one visible light laser diode in the laser module may include at least one visible light laser diode selected from the group consisting of: a red laser diode, a green laser diode, a blue laser diode, and any combination of a red laser diode, a green laser diode, and/or a blue laser diode.

The first hologram may apply a first optical power to the visible light and the second hologram may apply a second optical power to the infrared light, the second optical power different from the first optical power. The first optical power may be a positive optical power and the first optical power may be greater than the second optical power. The second optical power may be less than or equal to zero.

The laser projector may further include: a support frame that has a general shape and geometry of a pair of eyeglasses, wherein the laser module, the scan mirror, the wavelength-multiplexed holographic optical element, and the infrared detector are all carried by the support frame, and wherein the wavelength-multiplexed holographic optical element is substantially transparent to environmental light and positioned in a field of view of at least one eye of the user when the support frame is worn on a head of the user.

A wearable heads-up display may be summarized as including: a support frame that in use is worn on a head of a user; a laser module carried by the support frame, the laser module including an infrared laser diode to output an infrared light and at least one visible light laser diode to output a visible light; a scan mirror carried by the support frame and aligned with an output of the laser module to receive both the infrared light and the visible light output by the laser module, the scan mirror to controllably reflect both the infrared light and the visible light; a wavelength-multiplexed holographic optical element carried by the support frame and positioned within a field of view of at least one eye of the user when the support frame is worn on the head of the user, the wavelength-multiplexed holographic optical element aligned to receive both the infrared light and the visible light reflected from the scan mirror and to redirect both the infrared light and the visible light towards the at least one eye of the user when the support frame is worn on the head of the user, wherein the wavelength-multiplexed holographic optical element includes a first hologram that is responsive to the visible light and unresponsive to the infrared light and a second hologram that is responsive to the infrared light and unresponsive to the visible light, and wherein the wavelength-multiplexed holographic optical element is substantially transparent to environmental light; and an infrared detector carried by the support frame and aligned to receive at least a portion of infrared light reflected from the at least one eye of the user when the support frame is worn on the head of the user. The support frame may have a general shape and appearance of a pair of eyeglasses. The wavelength-multiplexed holographic optical element may comprise at least two distinct layers of holographic material, a first layer of holographic material that includes the first hologram and a second layer of holographic material that includes the second hologram. Alternatively, the wavelength-multiplexed holographic optical element may comprise a single volume of holographic material that includes both the first hologram and the second hologram. The at least one visible light laser diode in the laser module may include at least one visible light laser diode selected from the group consisting of: a red laser diode, a green laser diode, a blue laser diode, and any combination of a red laser diode, a green laser diode, and/or a blue laser diode.

The first hologram may apply a first optical power to the visible light and the second hologram may apply a second optical power to the infrared light, the second optical power different from the first optical power. The first optical power may be a positive optical power and the first optical power may be greater than the second optical power. The second optical power may be less than or equal to zero.

A method of operating a laser projector to project an image to an eye of a user and to track the eye of the user may be summarized as including: outputting visible light by at least a first laser diode of the laser projector, the visible light representative of at least a portion of the image; outputting infrared light by an infrared laser diode of the laser projector; controllably and reflectively scanning both the visible light and the infrared light by a scan mirror of the laser projector; redirecting both the visible light and the infrared light towards the eye of the user by a wavelength-multiplexed holographic optical element; detecting a reflection of at least a portion of the infrared light from the eye of the user by an infrared photodetector; and determining a position of at least one feature of the eye based on the reflection of at least a portion of the infrared light from the eye of the user detected by the infrared photodetector.

Redirecting both the visible light and the infrared light towards the eye of the user by a wavelength-multiplexed holographic optical element may include: applying a first optical power to the visible light by a first hologram of the wavelength-multiplexed holographic optical element; and applying a second optical power to the infrared light by a second hologram of the wavelength-multiplexed holographic optical element, the second optical power different from the first optical power. Applying a first optical power to the visible light by a first hologram of the wavelength-multiplexed holographic optical element may include applying a first positive optical power to the visible light by the first hologram of the wavelength-multiplexed holographic optical element. Applying a second optical power to the infrared light by a second hologram of the wavelength-multiplexed holographic optical element may include applying a second optical power that is less than the first optical power to the infrared light by the second hologram of the wavelength-multiplexed holographic optical element. Applying a second optical power that is less than the first optical power to the infrared light by the second hologram of the wavelength-multiplexed holographic optical element may include applying a second optical power that is less than or equal to zero to the infrared light by the second hologram of the wavelength-multiplexed holographic optical element. Determining a position of at least one feature of the eye based on the reflection of the infrared light from the eye of the user detected by the infrared photodetector may include determining the position of at least one feature of the eye based on the reflection of the infrared light from the eye of the user by a processor. Outputting visible light by at least a first laser diode of the laser projector may include at least one of: outputting red light by a red laser diode of the laser projector; outputting green light by a green laser diode of the laser projector; and/or outputting blue light by a blue laser diode of the laser projector.

A laser projector with an integrated eye tracker may be summarized as including: a laser module to output laser light, wherein the laser module includes a first laser diode to contribute a first visible laser light in a first narrow waveband to the laser light output by the laser module, the first visible laser light representative of at least a first portion of an image; a scan mirror aligned with an output of the laser module to receive the laser light output by the laser module and to controllably reflect the laser light output by the laser module; a holographic optical element aligned to receive the laser light reflected from the scan mirror and to redirect the laser light towards an eye of a user, wherein the holographic optical element includes a first hologram that is responsive to the first visible laser light in the first narrow waveband and unresponsive to light that is outside of the first narrow waveband; and a first narrow waveband photodetector aligned to receive at least a portion of the laser light that is reflected from the eye of the user, wherein the first narrow waveband photodetector is responsive to the first visible laser light in the first narrow waveband and unresponsive to light that is outside of the first narrow waveband. The laser module may include a second laser diode to contribute a second visible laser light in a second narrow waveband to the laser light output by the laser module, the second narrow waveband different from the first narrow waveband. The second visible laser light may be representative of at least a second portion of the image. The first hologram may be unresponsive to the second visible laser light in the second narrow waveband. The holographic optical element may be a wavelength-multiplexed holographic optical element that includes at least a second hologram that is responsive to the second visible laser light in the second narrow waveband and unresponsive to the first visible laser light in the first narrow waveband. The laser projector may further include a second narrow waveband photodetector, the second narrow waveband photodetector responsive to the second visible laser light in the second narrow waveband and unresponsive to light that is outside of the second narrow waveband. The laser module may include a third laser diode to contribute a third visible laser light in a third narrow waveband to the laser light output by the laser module, the third narrow waveband different from both the first narrow waveband and the second narrow waveband. The third visible laser light may be representative of at least a third portion of the image. The first hologram may be unresponsive to third visible laser light in the third narrow waveband. The second hologram may be unresponsive to the third visible laser light in the third narrow waveband. The wavelength-multiplexed holographic optical element may include a third hologram that is responsive to the third visible laser light in the third narrow waveband and unresponsive to both the first visible laser light in the first narrow waveband and the second visible laser light in the second narrow waveband. The laser projector may further include a third narrow waveband photodetector, the third narrow waveband photodetector responsive to the third visible laser light in the third narrow waveband and unresponsive to light that is outside of the third narrow waveband.

The first laser diode may be a red laser diode and the first narrow waveband may correspond to a first range of wavelengths that are visible as red to the eye of the user. The second laser diode may be a green laser diode and the second narrow waveband may correspond to a second range of wavelengths that are visible as green to the eye of the user. The third laser diode may be a blue laser diode and the third narrow waveband may correspond to a third range of wavelengths that are visible as blue to the eye of the user.

The holographic optical element may comprise at least three distinct layers of holographic material: a first layer of holographic material that includes the first hologram, a second layer of holographic material that includes the second hologram, and a third layer of holographic material that includes the third hologram. Alternatively, the holographic optical element may comprise a single volume of holographic material that includes all three of the first hologram, the second hologram, and the third hologram.

The first hologram may apply a first optical power to the first visible laser light in the first narrow waveband, the second hologram may apply the same first optical power to the second visible light in the second narrow waveband, and the third hologram may apply the same first optical power to the third visible laser light in the third narrow waveband.

The laser projector may further include: a support frame that has a general shape and appearance of a pair of eyeglasses, wherein the laser module, the scan mirror, the wavelength-multiplexed holographic optical element, and the first narrow waveband photodetector are all carried by the support frame, and wherein the wavelength-multiplexed holographic optical element is substantially transparent to environmental light and positioned in a field of view of at least one eye of the user when the support frame is worn on a head of the user.

A wearable heads-up display may be summarized as including: a support frame that in use is worn on a head of a user; a laser module carried by the support frame, the laser module including a first laser diode to output a first visible laser light in a first narrow waveband, the first visible laser light representative of at least a first portion of an image; a scan mirror carried by the support frame and aligned with an output of the laser module to receive the first visible laser light and to controllably reflect the first visible laser light; a holographic optical element carried by the support frame and positioned within a field of view of at least one eye of the user when the support frame is worn on the head of the user, the holographic optical element aligned to receive the first visible laser light reflected from the scan mirror and to redirect the first visible laser light towards the at least one eye of the user when the support frame is worn on the head of the user, wherein the holographic optical element includes a first hologram that is responsive to the first visible laser light in the first narrow waveband and unresponsive to light that is outside of the first narrow waveband, and wherein the holographic optical element is substantially transparent to environmental light; and a first narrow waveband photodetector carried by the support frame and aligned to receive at least a portion of the first visible laser light that is reflected from the at least one eye of the user when the support frame is worn on the head of the user, wherein the first narrow waveband photodetector is responsive to the first visible laser light in the first narrow waveband and unresponsive to light that is outside of the first narrow waveband. The support frame may have a general shape and appearance of a pair of eyeglasses.

The laser module of the wearable heads-up display may include a second laser diode to output a second visible laser light in a second narrow waveband, the second narrow waveband different from the first narrow waveband, wherein the second visible laser light is representative of at least a second portion of the image. The first hologram may be unresponsive to the second visible laser light in the second narrow waveband. The holographic optical element may be a wavelength-multiplexed holographic optical element that includes at least a second hologram that is responsive to the second visible laser light in the second narrow waveband and unresponsive to the first visible laser light in the first narrow waveband. The wearable heads-up display may further include a second narrow waveband photodetector, the second narrow waveband photodetector responsive to the second visible laser light in the second narrow waveband and unresponsive to light that is outside of the second narrow waveband. The laser module of the wearable heads-up display may include a third laser diode to output a third visible laser light in a third narrow waveband, the third narrow waveband different from both the first narrow waveband and the second narrow waveband, wherein the third visible laser light is representative of at least a third portion of the image. The first hologram may be unresponsive to third visible laser light in the third narrow waveband. The second hologram may be unresponsive to the third visible laser light in the third narrow waveband. The wavelength-multiplexed holographic optical element may include a third hologram that is responsive to the third visible laser light in the third narrow waveband and unresponsive to both the first visible laser light in the first narrow waveband and the second visible laser light in the second narrow waveband. The wearable heads-up display may further include a third narrow waveband photodetector, the third narrow waveband photodetector responsive to the third visible laser light in the third narrow waveband and unresponsive to light that is outside of the third narrow waveband.

The first laser diode may be a red laser diode and the first narrow waveband may correspond to a first range of wavelengths that are visible as red to the eye of the user. The second laser diode may be a green laser diode and the second narrow waveband may correspond to a second range of wavelengths that are visible as green to the eye of the user. The third laser diode may be a blue laser diode and the third narrow waveband may correspond to a third range of wavelengths that are visible as blue to the eye of the user.

The holographic optical element of the wearable heads-up display may comprise at least three distinct layers of holographic material: a first layer of holographic material that includes the first hologram, a second layer of holographic material that includes the second hologram, and a third layer of holographic material that includes the third hologram. Alternatively, the holographic optical element of the wearable heads-up display may comprise a single volume of holographic material that includes all three of the first hologram, the second hologram, and the third hologram.

The first hologram may apply a first optical power to the first visible laser light in the first narrow waveband, the second hologram may apply the same first optical power to the second visible light in the second narrow waveband, and the third hologram may apply the same first optical power to the third visible laser light in the third narrow waveband.

A method of operating a laser projector to project an image to an eye of a user and to track the eye of the user may be summarized as including: outputting visible laser light by a laser module, wherein the laser module includes at least a first laser diode and outputting visible laser light by the laser module includes outputting a first visible laser light in a first narrow waveband from the first laser diode of the laser module, and wherein the first visible laser light is representative of at least a first portion of an image; controllably and reflectively scanning the visible laser light by a scan mirror; redirecting the visible laser light towards the eye of the user by a holographic optical element; detecting a reflection of at least a portion of the visible laser light from the eye of the user by at least a first narrow waveband photodetector, wherein the first narrow waveband photodetector is responsive to light in the first narrow waveband and substantially unresponsive to light that is outside of the first narrow waveband, and wherein detecting a reflection of the at least a portion of the visible laser light from the eye of the user by at least a first narrow waveband photodetector includes detecting a reflection of the first portion of the image by the first narrow waveband photodetector; and determining a position of at least one feature of the eye based on at least the reflection of the first portion of the image from the eye of the user detected by the first narrow waveband photodetector.

The laser module may include a second laser diode and outputting visible light by a laser module may further include outputting a second visible laser light in a second narrow waveband by the second laser diode of the laser module, the second narrow waveband different from the first narrow waveband. The second visible laser light may be representative of at least a second portion of the image. Controllably and reflectively scanning the visible laser light by a scan mirror may include controllably and reflectively scanning both the first portion of the image and the second portion of the image by the scan mirror. The holographic optical element may be a wavelength-multiplexed holographic optical element comprising a first hologram that is responsive to light in the first narrow waveband and unresponsive to light that is outside the first narrow waveband and a second hologram that is responsive to light in the second narrow waveband and unresponsive to light that is outside the second narrow waveband. Redirecting the visible laser light towards the eye of the user by the holographic optical element may include redirecting the first portion of the image towards the eye of the user by the first hologram of the wavelength-multiplexed holographic optical element and redirecting the second portion of the image towards the eye of the user by the second hologram of the wavelength-multiplexed holographic optical element. Detecting a reflection of at least a portion of the visible laser light from the eye of the user by at least a first narrow waveband photodetector may further include detecting a reflection of the second portion of the image from the eye of the user by a second narrow waveband photodetector, wherein the second narrow waveband photodetector is responsive to light in the second narrow waveband and substantially unresponsive to light that is outside of the second narrow waveband. Determining a position of at least one feature of the eye based on at least the reflection of the first portion of the image from the eye of the user detected by the first narrow waveband photodetector may further include determining a position of at least one feature of the eye based on the reflection of the second portion of the image from the eye of the user detected by the second narrow waveband photodetector.

The laser module may include a third laser diode and outputting visible light by a laser module may further include outputting a third visible laser light in a third narrow waveband by the third laser diode of the laser module, the third narrow waveband different from both the first narrow waveband and the second narrow waveband. The third visible laser light may be representative of at least a third portion of the image. Controllably and reflectively scanning the visible laser light by a scan mirror may further include controllably and reflectively scanning the third portion of the image by the scan mirror. The wavelength-multiplexed holographic optical element may further include a third hologram that is responsive to light in the third narrow waveband and unresponsive to light that is outside the third narrow waveband. Redirecting the visible laser light towards the eye of the user by the HOE may further include redirecting the third portion of the image towards the eye of the user by the third hologram of the wavelength-multiplexed holographic optical element. Detecting a reflection of at least a portion of the visible laser light from the eye of the user by at least a first narrow waveband photodetector may further include detecting a reflection of the third portion of the image from the eye of the user by a third narrow waveband photodetector, wherein the third narrow waveband photodetector is responsive to light in the third narrow waveband and substantially unresponsive to light that is outside of the third narrow waveband. Determining a position of at least one feature of the eye based on at least the reflection of the first portion of the image from the eye of the user detected by the first narrow waveband photodetector may further include determining a position of at least one feature of the eye based on the reflection of the third portion of the image from the eye of the user detected by the third narrow waveband photodetector.

The first laser diode may be a red laser diode and outputting a first visible laser light in a first narrow waveband by the first laser diode of the laser module may include outputting a red laser light by the red laser diode. The first portion of the image may be a red portion of the image.

The second laser diode may be a green laser diode and outputting a second visible laser light in a second narrow waveband by the second laser diode of the laser module may include outputting a green laser light by the green laser diode. The second portion of the image may be a green portion of the image.

The third laser diode may be a blue laser diode and outputting a third visible laser light in a third narrow waveband by the third laser diode of the laser module may include outputting a blue laser light by the blue laser diode. The third portion of the image may be a blue portion of the image.

A heterogeneous holographic optical element may be summarized as including: at least one layer of holographic material, wherein the at least one layer of holographic material includes: a first hologram to apply a first optical power to light having a first wavelength; and at least a second hologram to apply at least a second optical power to light having a second wavelength, the second optical power different from the first optical power and the second wavelength different from the first wavelength. The first hologram may redirect light having the first wavelength and apply the first optical power to the light having the first wavelength upon redirection of the light having the first wavelength. The second hologram may redirect light having the second wavelength and apply the second optical power to the light having the second wavelength upon redirection of the light having the second wavelength.

The first optical power may be a positive optical power and the first hologram may cause light having the first wavelength to converge at a first rate of convergence. The second optical power may be zero. The second optical power may be a negative optical power and the second hologram may cause light having the second wavelength to diverge. The second optical power may be positive and less than the first optical power, and the second hologram may cause light having the second wavelength to converge at a second rate of convergence that is less than the first rate of convergence. The first optical power may be greater than or equal to forty diopters and the second optical power may be less than or equal to zero diopters.

The first wavelength may be visible to a human eye and the second wavelength may be invisible to the human eye. The first wavelength may be selected from a first range of 390 nm to 700 nm and the second wavelength may be selected from a second range of 700 nm to 10 um.

The at least one layer of holographic material may include a single layer of holographic material and the first hologram and the at least a second hologram may both be included in the single layer of holographic material. Alternatively, the at least one layer of holographic material may include a first layer of holographic material and at least a second layer of holographic material, and the first layer of holographic material may include the first hologram and the second layer of holographic material may include the second hologram.

The at least one layer of holographic material may further include: at least a third hologram to apply the first optical power to light having a third wavelength, the third wavelength substantially different from both the first wavelength and the second wavelength. The first hologram may be a red hologram to apply the first optical power to a red light, the second hologram may be an infrared hologram to apply the second optical power to an infrared light, the third hologram may be a green hologram to apply the first optical power to a green light, and the at least one layer of holographic material may further include a blue hologram to apply the first optical power to a blue light.

The heterogeneous holographic optical element may further include an eyeglass lens, wherein the at least one layer of holographic material is carried by the eyeglass lens.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements are arbitrarily enlarged and positioned to improve drawing legibility. Further, the particular shapes of the elements as drawn are not necessarily intended to convey any information regarding the actual shape of the particular elements, and have been solely selected for ease of recognition in the drawings.

DETAILED DESCRIPTION

Figure 1:
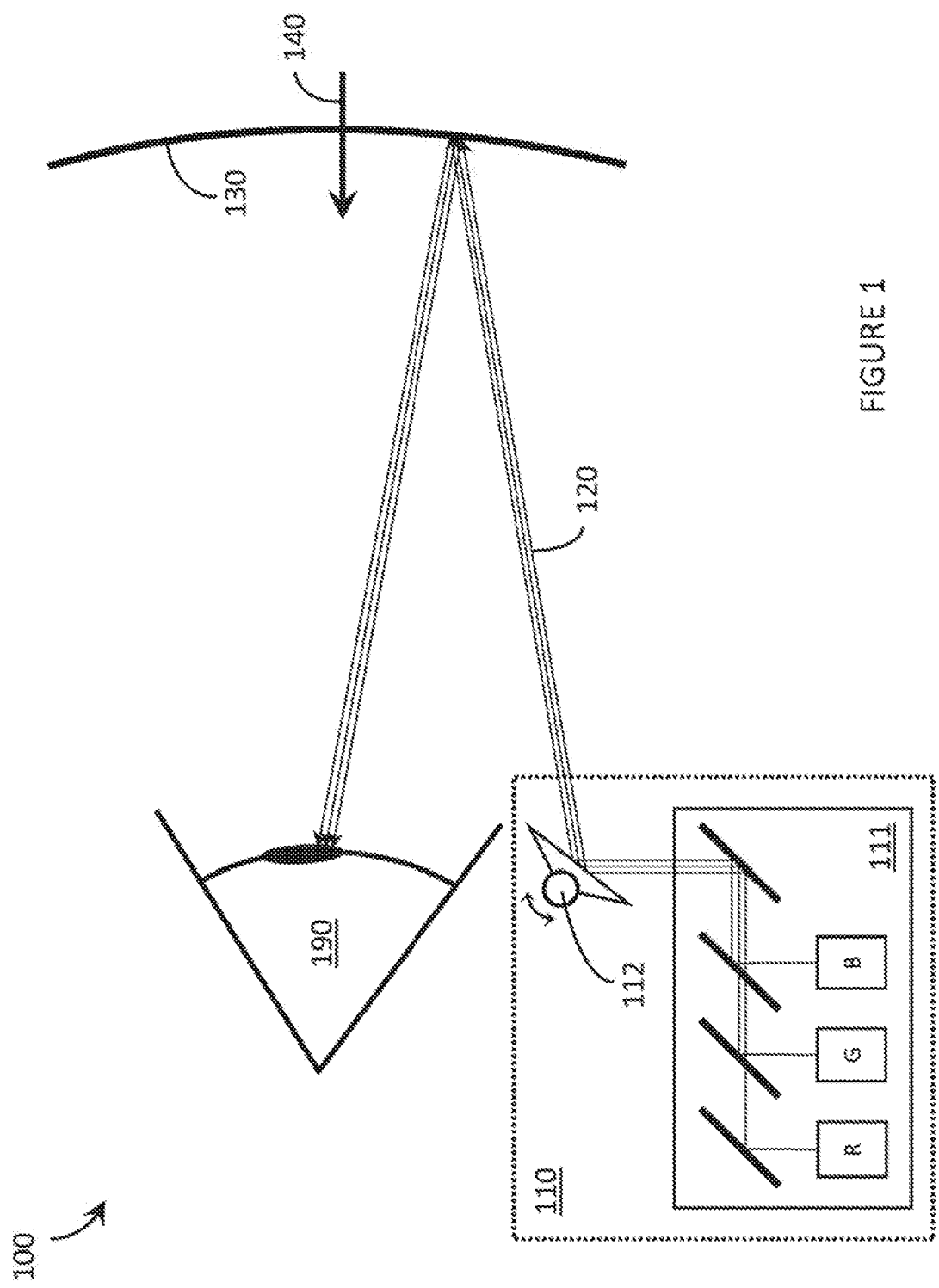
FIG. 1 is an illustrative diagram showing a side view of a wearable heads-up display that employs a scanning laser projector.

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with portable electronic devices and head-worn devices, have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its broadest sense, that is as meaning "and/or" unless the content clearly dictates otherwise.

The headings and Abstract of the Disclosure provided herein are for convenience only and do not interpret the scope or meaning of the embodiments.

The various embodiments described herein provide systems, devices, and methods for integrating eye tracking functionality into a scanning laser projector ("SLP"). An aspect hereof includes operating a SLP as both a projector and as a component of an eye tracker. While applicable in many different use cases, the present systems, devices, and methods are particularly well-suited for use in wearable heads-up displays ("WHUDs") that already employ at least one SLP. In accordance with the present systems, devices, and methods, a SLP in a WHUD may be adapted to simultaneously provide visible light for display purposes and infrared light for eye tracking purposes, thereby enabling eye tracking functionality in the WHUD with the addition of only a small number of discreet, unobtrusive components.

The present systems, devices, and methods are well-suited for use in WHUDs, and particularly in WHUDs that already employ at least one SLP. Examples of such displays are described in U.S. Provisional Patent Application Ser. No. 62/017,089; U.S. Provisional Patent Application Ser. No. 62/053,598; U.S. Provisional Patent Application Ser. No. 62/117,316; U.S. Provisional Patent Application Ser. No. 62/134,347 (now U.S. Non-Provisional patent application Ser. No. 15/070,887); U.S. Provisional Patent Application Ser. No. 62/156,736; U.S. Provisional Patent Application Ser. No. 62/242,844; US Patent Publication No. 2015-0378164 A1; US Patent Publication No. 2015-0378161 A1; US Patent Publication No. 2015-0378162 A1; U.S. Non-Provisional patent application Ser. No. 15/145,576; U.S. Non-Provisional patent application Ser. No. 15/145,609; U.S. Non-Provisional patent application Ser. No. 15/145,583; U.S. Non-Provisional patent application Ser. No. 15/046,234; U.S. Non-Provisional patent application Ser. No. 15/046,254; and U.S. Non-Provisional patent application Ser. No. 15/046,269. A generalized example of such a WHUD architecture, without eye-tracking capability, is provided in FIG. 1.

FIG. 1 is an illustrative diagram showing a side view of a WHUD 100 that employs a SLP 110. SLP 110 comprises a laser module 111 that includes a red laser diode (labelled "R" in FIG. 1), a green laser diode (labelled "G" in FIG. 1), and a blue laser diode (labelled "B" in FIG. 1), and a scan mirror 112 that is controllably rotatable about two axes of freedom. A single scan mirror 112 that is rotatable about two axes of freedom is used only as an illustrative example herein and a person of skill in the art will appreciate that similar functionality may be realized using a different mirror configuration, such as for example two scan mirrors that are each controllably rotatable about a respective one of two orthogonal axes of freedom and respectively positioned in sequence with respect to the optical path of laser light 120. Laser light 120 output by SLP 110 may comprise any modulated combination of red laser light (output by the red laser diode), green laser light (output by the green laser diode), and/or blue laser light (output by the blue laser diode). Laser light 120 reflected from scan mirror 112 is incident on a holographic optical element ("HOE") 130 that redirects laser light 120 back towards an eye 190 of a user. Generally, in the present systems, devices, and methods, the term "user" refers to a user of a SLP. In the specific context of FIG. 1, the term "user" refers to a person wearing or using WHUD 100. A person of skill in the art will appreciate that WHUD 100 may include a support frame and/or other support/alignment structure(s) (not depicted in FIG. 1 to reduce clutter) that enable a user to wear the elements depicted in FIG. 1 so that at least HOE 130 is positioned within a field of view of at least one eye 190 of the user when WHUD 100 is worn on a head of the user.

HOE 130 may be substantially optically transparent to environmental light 140 (i.e., optically transparent to the majority of wavelengths that make up environmental light 140) incident from the opposite side of HOE 130 relative to laser light 120. Because HOE 130 effectively combines projected laser light 120 and external environmental light 140 in the user's field of view, HOE 130 may be referred to as a "combiner" or related variant, such as "transparent combiner," "holographic optical combiner," or similar. If the support frame (not illustrated) of WHUD 100 has the general shape, appearance, and/or geometry of a pair of eyeglasses, then HOE 130 may be carried on one or more transparent lens(es) of WHUD 100 (such as one or more prescription lenses or one or more non-prescription lenses). Further details on the composition of HOE 130 (e.g., including exemplary multiplexed configurations of HOE 130) and on ways in which HOE 130 may redirect laser light 120 towards eye 190 (e.g., including exemplary exit pupil and eyebox configurations) are described in at least the patent applications listed above.

WHUD 100 is an example of a WHUD that employs a SLP 110 but does not provide any eye tracking functionality. An example of how conventional eye tracking functionality may be added to WHUD 100 is illustrated in FIG. 2.

Figure 2:
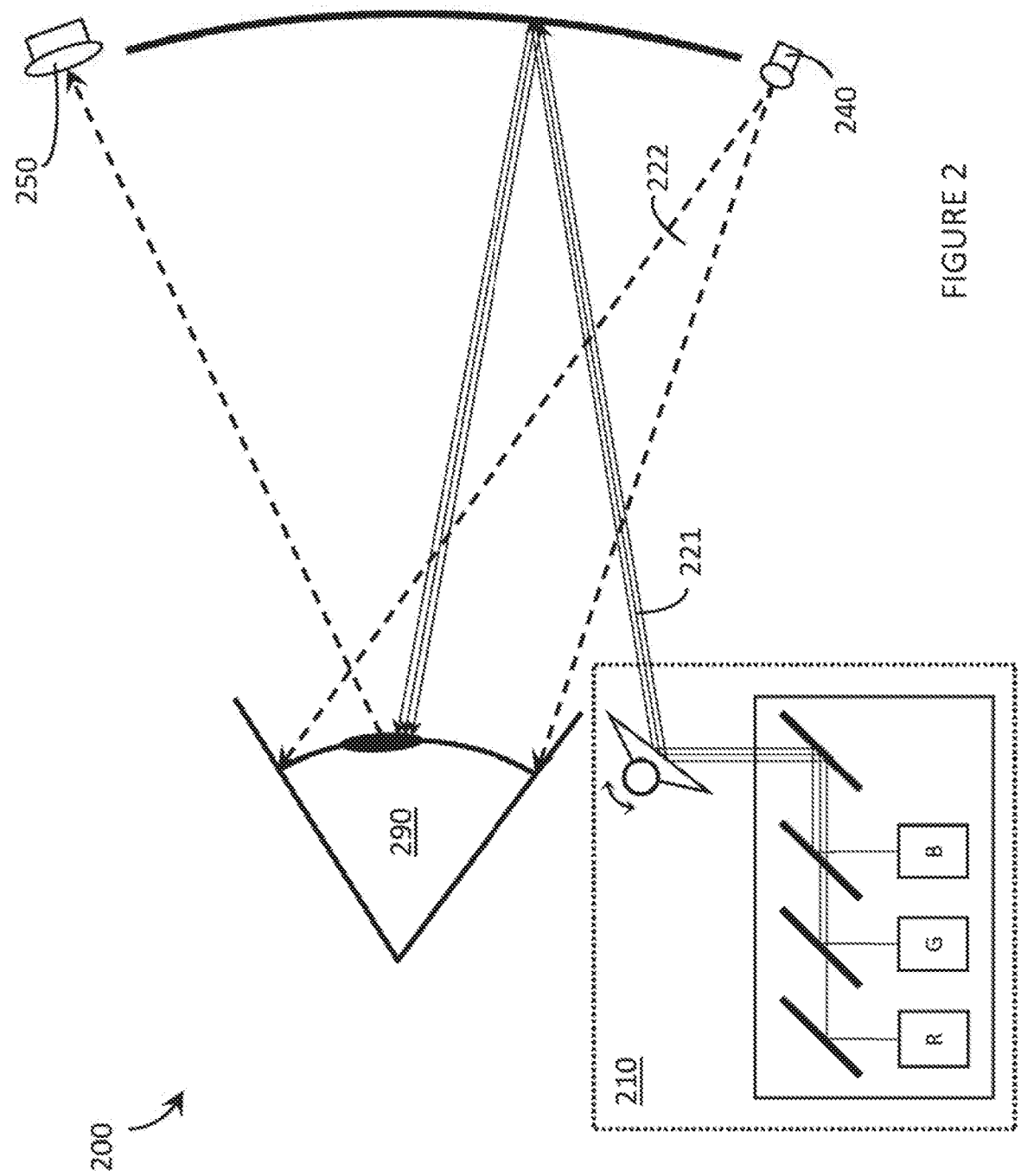
FIG. 2 is an illustrative diagram showing a side view of a wearable heads-up display that employs a scanning laser projector and a separate eye tracking system.

FIG. 2 is an illustrative diagram showing a side view of a WHUD 200 that employs a SLP 210 and a separate eye tracking system. WHUD 200 is substantially similar to WHUD 100 from FIG. 1, except WHUD 200 includes an eye tracking system comprising additional components 240 and 250 to enable eye tracking functionality in WHUD 200. The eye tracking system of WHUD 200 includes an infrared light source 240 and an infrared photodetector 250. In use, infrared light source 240 completely illuminates or "floods" the eye 290 with a single large spot of infrared light 222 (drawn in dashed lines to denote that the infrared light 222 is invisible to eye 290, and to distinguish from visible light 221 output by SLP 210). Infrared photodetector 250 detects reflections of the infrared light 222 from the user's eye 290. Different features of eye 290 (e.g., the cornea, the pupil, the iris, and/or retinal blood vessels) can cause portions of the single large spot of incident infrared light 222 to reflect from eye 290 in different ways; thus, the location of such feature(s) of eye 290 relative to infrared light source 240 and photodetector 250 can influence the intensity of infrared light 222 detected by photodetector 250. As infrared light source 240 floods eye 290 with infrared light, photodetector 250 detects an intensity pattern or map of reflected infrared light 222 that depends on the position/orientation of eye 290. That is, the intensity of infrared light 222 detected by photodetector 250 depends on the position/orientation of eye 290 (or the position/orientation of feature(s) of eye 290, such as the cornea, pupil, and so on). The intensity pattern/map detected by photodetector 250 depends on where eye 290 is looking. In this way, the combination of discrete components (infrared light source 240 and infrared photodetector 250) in the eye tracking system of WHUD 200 enable both the gaze direction and movements of eye 290 to be measured and tracked.

WHUD 200 depicts an example architecture in which a SLP 210 and an eye tracking system (comprising infrared light source 240 and infrared photodetector 250) are both included as completely separate and independent subsystems. Such an implementation may be acceptable for some systems, but in general it is advantageous for a WHUD to be as compact and streamlined as possible, both in terms of form factor and processing/power requirements. The various embodiments described herein provide systems, devices, and methods for integrating eye tracking functionality into a SLP to provide a more efficient system in terms of form factor and processing/power requirements.

Figure 3:
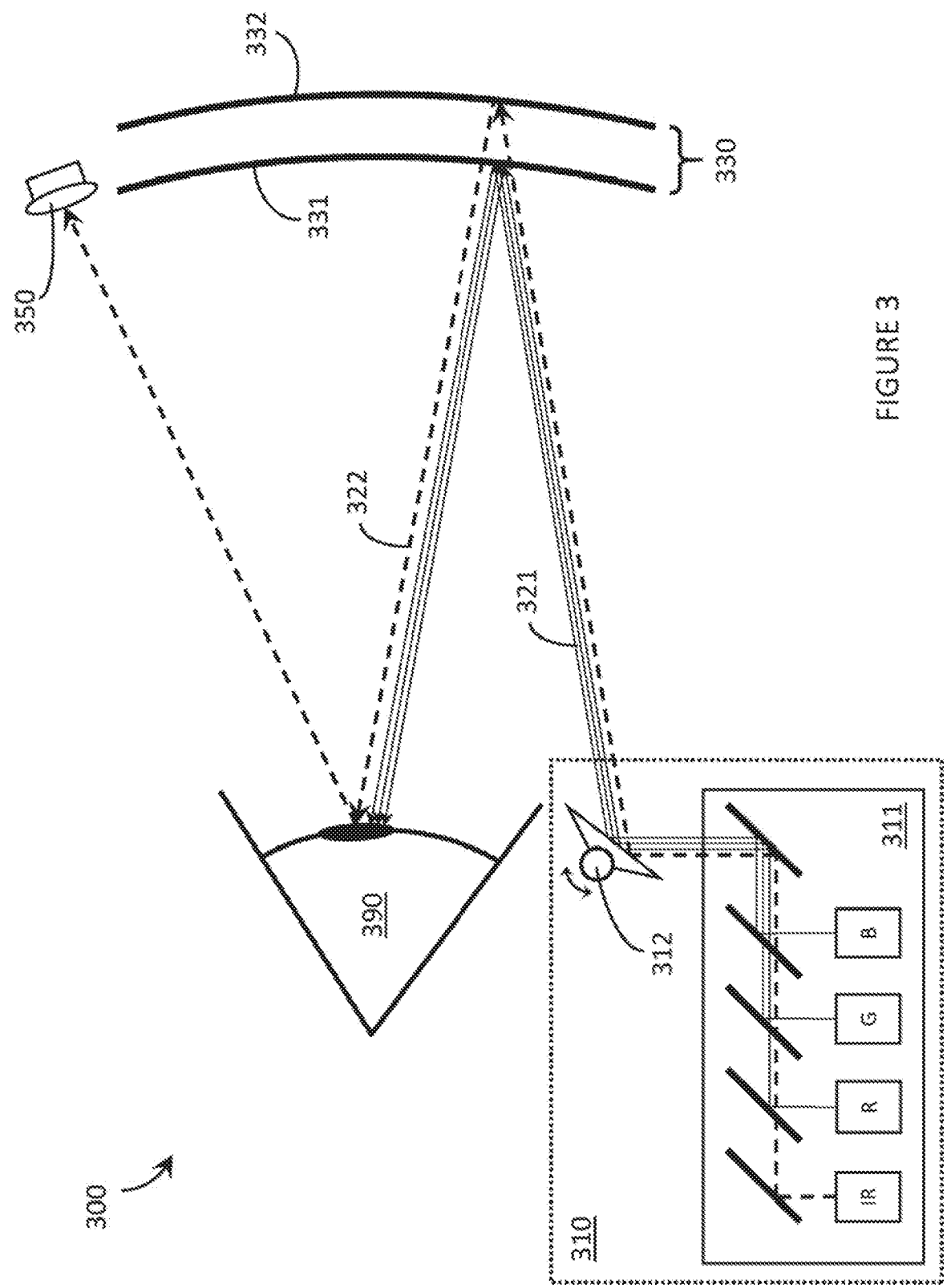
FIG. 3 is an illustrative diagram showing a wearable heads-up display that includes a scanning laser projector that has been adapted to integrate eye tracking functionality in accordance with the present systems, devices, and methods.

FIG. 3 is an illustrative diagram showing a WHUD 300 that includes a SLP 310 with an integrated eye tracking functionality in accordance with the present systems, devices, and methods. WHUD 300 is substantially similar to WHUD 200 from FIG. 2, except that in WHUD 300 scanning laser projection and eye tracking components are both integrated into a single package/module 310. Specifically, SLP 310 comprises a laser module 311 that includes red laser diode (labelled "R" in FIG. 3), a green laser diode (labelled "G" in FIG. 3), and a blue laser diode (labelled "B" in FIG. 3) and a scan mirror 312 in a similar configuration to that described for WHUD 100 of FIG. 1. However, in addition, laser module 311 also includes an infrared laser diode (labelled "IR" in FIG. 3) for use in eye tracking in a similar way to that described for infrared light source 240 in WHUD 200. Scan mirror 312 simultaneously serves as both the scan mirror for laser projection (in a similar way to scan mirror 112 from WHUD 100 of FIG. 1) and a scan mirror for eye tracking, whereby scan mirror 312 scans infrared laser light (represented by dashed lines 322 in FIG. 3) over the area of eye 390 to sequentially illuminate the entire area of eye 390 (e.g., via a raster scan of IR light). While WHUD 200 includes an infrared light source 240 that is separate from the projector laser module 211, in WHUD 300 infrared laser diode 341 is integrated into laser module 311 of SLP 310 and scan mirror 312 serves to scan both visible (R, G, and/or B) and infrared (IR) laser light over eye 390.

Scan mirror 312 may advantageously include one or multiple (e.g., in a DLP configuration) digital microelectromechanical systems ("MEMS") mirror(s). In typical operation, scan mirror 312 of SLP 310 repeatedly scans over its entire range of positions and effectively scans over the entire field of view of the display. Whether or not an image/pixel is projected at each scan position depends on controlled modulation of laser module 311 and its synchronization with scan mirror 312. The fact that scan mirror 312 generally scans over its entire range during operation as a laser projector makes scan mirror 312 of SLP 310 compatible with use for eye tracking purposes. SLP 310 is adapted to provide eye tracking functionality without having to compromise or modify its operation as a SLP. In operation, scan mirror 312 repeatedly scans over its entire range of positions while the RGB laser diodes are modulated to provide the visible light 321 corresponding to pixels of a scanned image. At the same time, the infrared laser diode may be activated to illuminate the user's eye 390 (one spot or pixel at a time, each corresponding to a respective scan mirror position) with infrared laser light 322 for eye tracking purposes.

Depending on the implementation, the infrared laser diode may simply be on at all times to completely illuminate (i.e., scan over the entire area of) eye 390 with infrared laser light 322 or the infrared laser diode may be modulated to provide an illumination pattern (e.g., a grid, a set of parallel lines, a crosshair, or any other shape/pattern) on eye 390. Because infrared laser light 322 is invisible to eye 390 of the user, infrared laser light 322 does not interfere with the scanned image being projected by SLP 310.

In order to detect the (e.g., portions of) infrared laser light 322 that reflects from eye 390, WHUD 300 includes at least one infrared photodetector 350 similar to photodetector 250 from WHUD 200 of FIG. 2. While only one photodetector 350 is depicted in FIG. 3, in alternative embodiments any number of photodetectors 350 may be used (e.g., an array of photodetectors 350, or a charge-coupled device based camera that is responsive to light in the infrared wavelength range) positioned in any arrangements and at any desired location(s) depending on the implementation.

As scan mirror 312 scans modulated R, G, and/or B light 321 over eye 390 to produce a displayed image based on modulation of the R, G, and/or B laser diodes, scan mirror 312 also scans infrared laser light 322 over eye 390 based on modulation of the IR laser diode. Photodetector 350 detects an intensity pattern or map of reflected infrared laser light 322 that depends on the position/orientation of eye 390. That is, each distinct position of scan mirror 312 may result in a respective intensity of infrared laser light 322 being detected by photodetector 350 that depends on the position/orientation of eye 390 (or the position/orientation of feature(s) of eye 390, such as the cornea, iris, pupil, and so on). The intensity pattern/map detected by photodetector 350 depends on where eye 390 is looking. In this way, the same SLP 310 in WHUD 300 enables both i) image projection, and ii) the gaze direction and movements of eye 390 to be measured and tracked.

Another adaptation to WHUD 300 relative to WHUD 200, for the purpose of integrating eye tracking functionality into SLP 310, is wavelength-multiplexing of HOE 330. In the same way as described for HOE 130 of WHUD 100, WHUD 300 also includes a HOE 330 that redirects laser light output from the laser module 311 of SLP 310 towards eye 390; however, in WHUD 300, HOE 330 has been adapted (relative to HOE 130 of FIG. 1) to include at least two wavelength-multiplexed holograms: at least a first hologram 331 that is responsive to (i.e., redirects at least a portion of, the magnitude of the portion depending on the playback efficiency of the first hologram) the visible light 321 output by laser module 311 and unresponsive to (i.e., transmits) the infrared light 322 output by laser module 311, and a second hologram 332 that is responsive to (i.e., redirects at least a portion of, the magnitude of the portion depending on the playback efficiency of the second hologram) the infrared light 322 output by laser module 311 and unresponsive to (i.e., transmits) the visible light 321 output by laser module 311. While FIG. 3 depicts first hologram 331 as a single hologram, in practice the aspect(s) of HOE 330 that is/are responsive to the visible light 321 output by laser module 311 may include any number of holograms that may be multiplexed in a variety of different ways, including without limitation: wavelength multiplexed (i.e., a "red" hologram that is responsive to only red light from the red laser diode of laser module 311, a "green" hologram that is responsive to only green light from the green laser diode of laser module 311, and a "blue" hologram that is responsive to only blue light from the blue laser diode of laser module 311), angle multiplexed (e.g., for the purpose of eye box expansion/replication), phase multiplexed, spatially multiplexed, temporally multiplexed, and so on. Upon redirection of visible light 321, first hologram 331 may apply a first optical power to visible light 321. Advantageously, the first optical power applied by first hologram 331 (or by the first set of multiplexed holograms if the implementation employs a set of multiplexed holograms for redirecting the visible light 321) may be a positive optical power that focuses or converges the visible light 321 to, for example, an exit pupil having a diameter less than one centimeter (e.g., 6 mm, 5 mm, 4 mm, 3 mm) at the eye 390 of the user for the purpose of providing a clear and focused image with a wide field of view. Upon redirection of infrared light 322, second hologram 332 may apply a second optical power to infrared light 322, where the second optical power applied by second hologram 332 is different from the first optical power applied by first hologram 331. Advantageously, the first optical power may be greater than the second optical power (and therefore, the second optical power may be less than the first optical power) so that second hologram 332 redirects infrared light 322 over an area of eye 390 that is larger than the exit pupil of visible light 321 at eye 390. For example, the second optical power of second hologram 332 may apply a rate of convergence to infrared light 322 that is less than the rate of convergence applied to visible light 321 by the first optical power of first hologram 331, or the second optical power may be zero such that second hologram 332 redirects infrared light 322 towards eye 390 without applying any convergence thereto, or the second optical power may be negative (i.e., less than zero) so that the second optical power of second hologram 332 causes infrared light 322 to diverge (i.e., applies a rate of divergence thereto) to cover, for example, cover the entire area of eye 390 (and beyond, if desired) for the purpose of illuminating the entire area of eye 390 and tracking all eye positions/motions within that illuminated area.

Depending on the specific implementation, HOE 330 may comprise a single volume of holographic material (e.g., photopolymer or a silver halide compound) that encodes, carries, has embedded therein or thereon, or generally includes both first hologram 331 and second hologram 332, or alternatively HOE 330 may comprise at least two distinct layers of holographic material (e.g., photopolymer and/or a silver halide compound) that are laminated or generally layered together, a first layer of holographic material that includes first hologram 331 and a second layer of holographic material that includes second hologram 332. More details of an exemplary multiplexed HOE are described later one with reference to FIG. 8.

Throughout this specification and the appended claims, the term "infrared" includes "near infrared" and generally refers to a wavelength of light that is larger than the largest wavelength of light that is typically visible to the average human eye. Light that is visible to the average human eye (i.e., "visible light" herein) is generally in the range of 400 nm-700 nm, so as used herein the term "infrared" refers to a wavelength that is greater than 700 nm, up to 1 mm. As used herein and in the claims, visible means that the light includes wavelengths within the human visible portion of the electromagnetic spectrum, typically from approximately 400 nm (violet) to approximately 700 nm (red).

The use of infrared light is advantageous in eye tracking systems because infrared light is invisible to the (average) human eye and so does not disrupt or interfere with other optical content being displayed to the user. Integrating an infrared laser diode into a SLP, in accordance with the present systems, devices, and methods, enables visible laser projection and invisible eye tracking to be simultaneously performed by substantially the same hardware of a WHUD, thereby minimizing overall bulk and processing/power requirements of the system. However, the various embodiments described herein also include systems, devices, and methods of integrating eye tracking functionality into a SLP operated completely in the visible spectrum (i.e., without infrared light).

Figure 4:
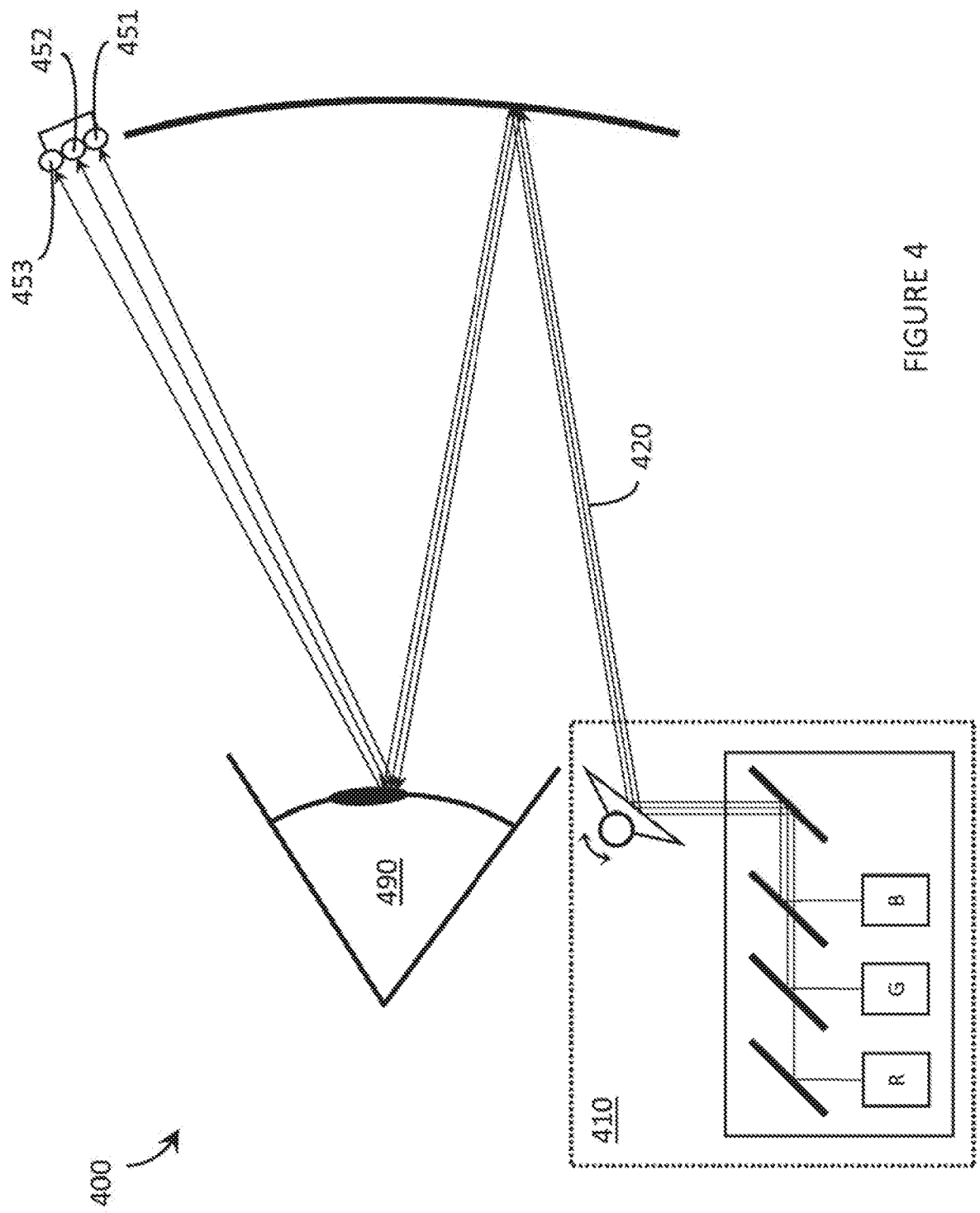
FIG. 4 is an illustrative diagram showing a side view of a wearable heads-up display that is adapted to integrate eye tracking functionality into a scanning laser projection system in accordance with the present systems, devices, and methods.

FIG. 4 is an illustrative diagram showing a side view of a WHUD 400 that is adapted to integrate eye tracking functionality into a scanning laser projection system in accordance with the present systems, devices, and methods. WHUD 400 is substantially similar to WHUD 100 from FIG. 1, except that WHUD 400 includes at least three narrow waveband photodetectors 451, 452, and 453 to detect visible laser light 420 (as opposed to at least one infrared photodetector 350 to detect infrared laser light) reflected from an eye 490 of a user and to use the resulting intensity pattern/map to determine the position and/or movements of eye 490.

WHUD 400 comprises a SLP 410 that includes three narrow waveband light sources: a red laser diode (labelled "R" in FIG. 4), a green laser diode (labelled "G" in FIG. 4), and a blue laser diode (labelled "B" in FIG. 4). Throughout this specification and the appended claims, the term "narrow waveband" refers to a relatively small range of wavelengths (or wavelength bandwidth) given the specific context. In the context of a light source such as a laser diode, a narrow waveband light is light within a bandwidth of about 10 nm or less; in the context of a photodetector, a narrow waveband photodetector is responsive to light within a bandwidth of about 200 nm or less. Laser light 420 from SLP 410 is modulated to project an image on the eye 490 of the user as described for WHUD 100 of FIG. 1. However, WHUD 400 also includes: a first narrow waveband photodetector 451 responsive to laser light 420 in the narrow waveband corresponding to light output by the red laser diode of SLP 410, a second narrow waveband photodetector 452 responsive to laser light 420 in the narrow waveband corresponding to light output by the green laser diode of SLP 410, and a third narrow waveband photodetector 453 responsive to laser light 420 in the narrow waveband corresponding to light output by the blue laser diode of SLP 410. Each of photodetectors 451, 452, and 453 is aligned to receive laser light 420 reflected from the eye 490 of the user to enable the position and/or motion of eye 490 to be determined. Each photodetector may be adapted to be responsive to a respective "narrow waveband" of light using one more optical filters, such as one or more optical bandpass filters. Photodetectors 451, 452, and 453 are advantageously "narrow waveband" to minimize noise from detected environmental light.

WHUD 400 implements laser eye tracking using the same visible laser light 420 that also corresponds to images/pixels projected on the eye 490 of the user from SLP 410. An advantage to this scheme is that no infrared laser diode is required and SLP 410 may be used essentially without modification; however, a disadvantage is that the eye positions/motions must be determined subject to light from a projected image/pixel pattern instead of using the full invisible illumination afforded by infrared light. In accordance with the present systems, devices, and methods, communication between the image generation system of a SLP (i.e., the system that controls the modulation of laser light 420 in synchronization with the positions of the scan mirror) and the eye tracking system that determines the position/motion of eye 490 based on reflected light detected by narrow waveband photodetectors 451, 452, and 453 is advantageous. Such communication may include, for example, information about which laser diode is active at each mirror position. Using this information, the eye tracking system is able to map detected intensity information from photodetector(s) 451, 452, and/or 453 to various positions and/or motions of eye 490 based on the current scan mirror position and laser modulation pattern.

The various embodiments of eye tracking systems and devices described herein may, in some implementations, make use of "glint" and/or "Purkinje images" and/or may employ the "corneal shadow based" methods of eye tracking described in U.S. Provisional Patent Application Ser. No. 62/245,792.

In accordance with the present systems, devices, and methods, an eye tracking system (or an "eye tracker") may include one or more digital processor(s) communicatively coupled to the one or more (narrow waveband) photodetector(s) and to one or more non-transitory processor-readable storage medium(ia) or memory(ies). The memory(ies) may store processor-executable instructions and/or data that, when executed by the processor, enable the processor to determine the position and/or motion of an eye of the user based on information (e.g., intensity information, such as an intensity pattern/map) provided by the one or more photodetector(s).

Figure 5:
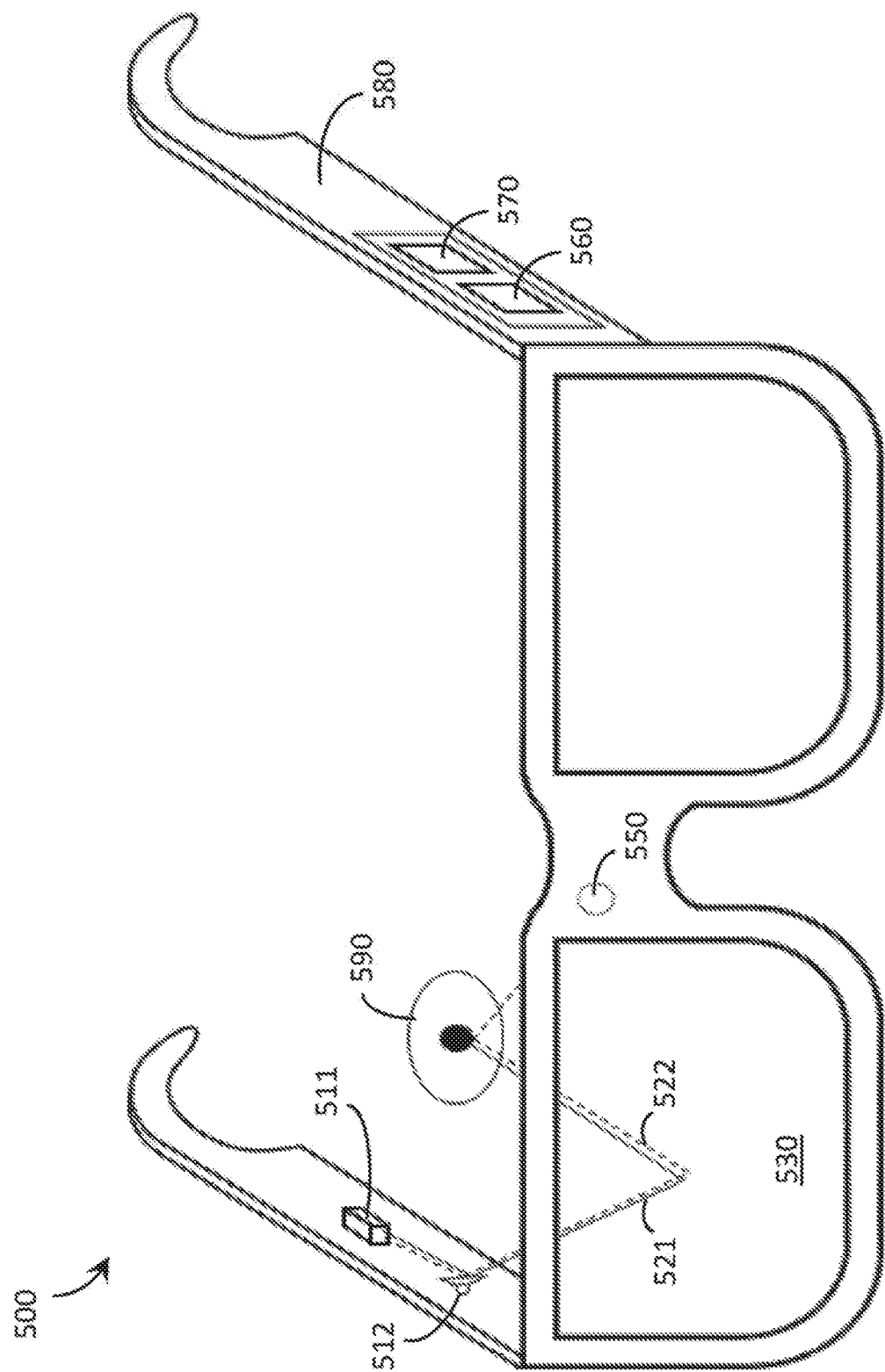
FIG. 5 is a perspective view of a wearable heads-up display that integrates eye tracking and scanning laser projection with minimal component additions in accordance with the present systems, devices, and methods.

FIG. 5 is a perspective view of a WHUD 500 that integrates eye tracking and scanning laser projection with minimal component additions in accordance with the present systems, devices, and methods. WHUD 500 includes many of the elements depicted in FIGS. 1, 2, 3, and 4, namely: a laser module 511 adapted to output a visible laser light 521 (e.g., in at least a first narrow waveband) and an infrared laser light 522, a scan mirror aligned to receive laser light output from the laser module and controllably reflect (i.e., scan) the laser light, a wavelength-multiplexed HOE 530 aligned to redirect the laser light 521 and 522 towards an eye 590 of a user, and at least one infrared photodetector 550 responsive to infrared laser light 522. Depending on the implementation, the visible laser light 521 may correspond to any of, either alone or in any combination, red laser light, a green laser light, and/or a blue laser light. WHUD 500 also includes a support frame 580 that has a general shape and appearance or a pair of eyeglasses, so that HOE 530 is positioned within a field of view of the eye 590 of the user when support frame 580 is worn on a head of the user.

WHUD 500 further includes a digital processor 560 communicatively coupled to photodetector 550 and a non-transitory processor-readable storage medium or memory 570 communicatively coupled to digital processor 570. Memory 570 stores processor-executable instructions and/or data that, when executed by processor 560, cause processor 560 to determine one or more position(s) and/or movement(s) of eye 590 based on information about infrared light 522 reflected from eye 590 communicated to processor 560 from photodetector 550.

The various embodiments described herein generally reference and illustrate a single eye of a user (i.e., monocular applications), but a person of skill in the art will readily appreciate that the present systems, devices, and methods may be duplicated in a WHUD in order to provide scanned laser projection and scanned laser eye tracking for both eyes of the user (i.e., binocular applications).

Some WHUDs (e.g., those that implement certain eyebox replication/expansion schemes) may involve various optical elements in the path of the laser light output by the SLP. In accordance with the present systems, devices, and methods, WHUDs that integrate an infrared laser diode into the SLP for eye tracking purposes may advantageously employ hot optical elements and/or cold optical elements as needed in order to align/separate the respective paths of the visible and infrared lasers. An example is depicted in FIG. 6.

Figure 6:
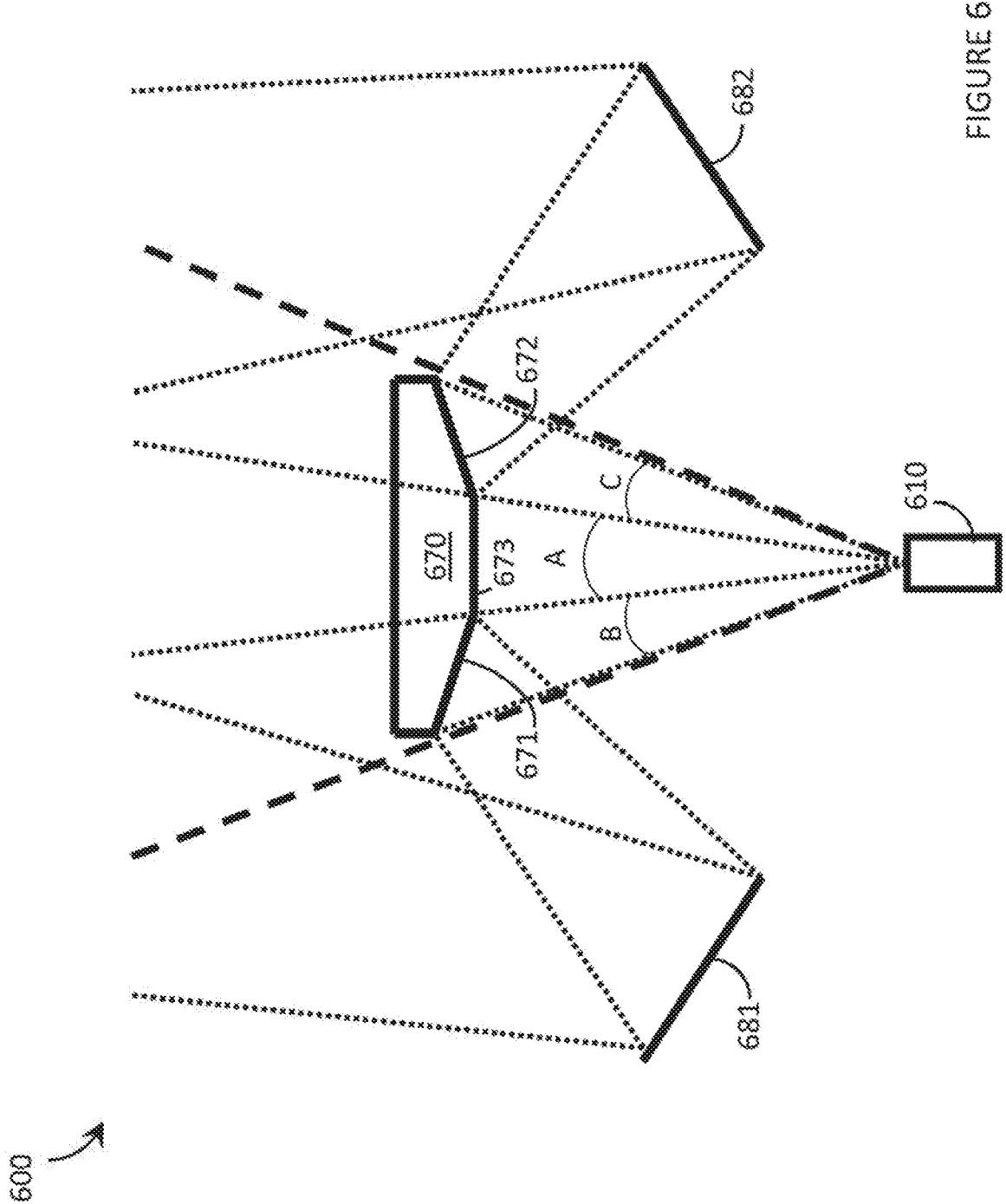
FIG. 6 is a schematic diagram of an adapted optical splitter for separating the output of a scanning projector into three angle-separated copies in accordance with the present systems, devices, and methods.

FIG. 6 is a schematic diagram of an adapted optical splitter 600 for separating the output of a SLP into three angle-separated copies as described in U.S. Provisional Patent Application Ser. No. 62/156,736 and U.S. Provisional Patent Application Ser. No. 62/242,844 (now U.S. Non-Provisional patent application Ser. No. 15/046,254). Splitter 600 includes an optical structure 670 having two reflective surfaces 671 and 672 oriented at respectively different angles and a transmissive region 673 therebetween. A SLP 610 (which may be substantially similar to SLP 310 from FIG. 3) has a scan range that includes subranges A, B, and C as indicated in FIG. 6. SLP 610 may be operated to scan visible light over three copies of an image: a first copy in scan range A, a second copy in scan range B, and a third copy in scan range C. The first copy of the image projected over scan range A is transmitted through transmissive region 673 of optical structure 670 to impinge on, for example, an angle-multiplexed holographic combiner. A second copy of the image projected over scan range B is reflected by first reflective surface 671 of optical structure 670 and then reflected again by a second reflector (e.g., mirror) 681. Second reflector 681 is oriented to redirect light corresponding to scan range B towards the holographic combiner (not shown in FIG. 6 to reduce clutter). A third copy of the image projected over scan range C is reflected by second reflected surface 672 of optical structure 670 and then reflected again by a third reflector (e.g., mirror) 682. Third reflector 682 is oriented to redirect light corresponding to scan range C towards the holographic combiner. The same modulation pattern (e.g., temporal, intensity, and/or spatial) of laser light may be repeated by SLP 610 over each of ranges A, B, and C and, in this way, three copies of an image may be produced by SLP 610 and directed towards an angle-multiplexed holographic combiner at respectively different angles. Optical splitter 600 represents an example of a configuration of an optical splitter that may be used in conjunction with an accordingly adapted SLP operational mode and an angle-multiplexed holographic combiner in order to expand the eyebox of a retinal scanning display system by exit pupil replication. In order to integrate infrared laser light, for eye tracking purposes, into a system that employs such a splitter, the splitter may, for example, be constructed of cold optical elements such that the infrared light is transmitted therethrough essentially without "seeing" or being influenced by the splitter. In this case, the infrared light (represented by dashed lines in FIG. 6) may be scanned over the entire range of A+B+C. Alternatively, the splitter 600 may be constructed of hot optical elements such that the infrared light is reflected thereby. In this case, the infrared light may only need to be modulated on for one of the three scan regions A, B, or C and modulated off for the other two scan regions.

Figure 7:
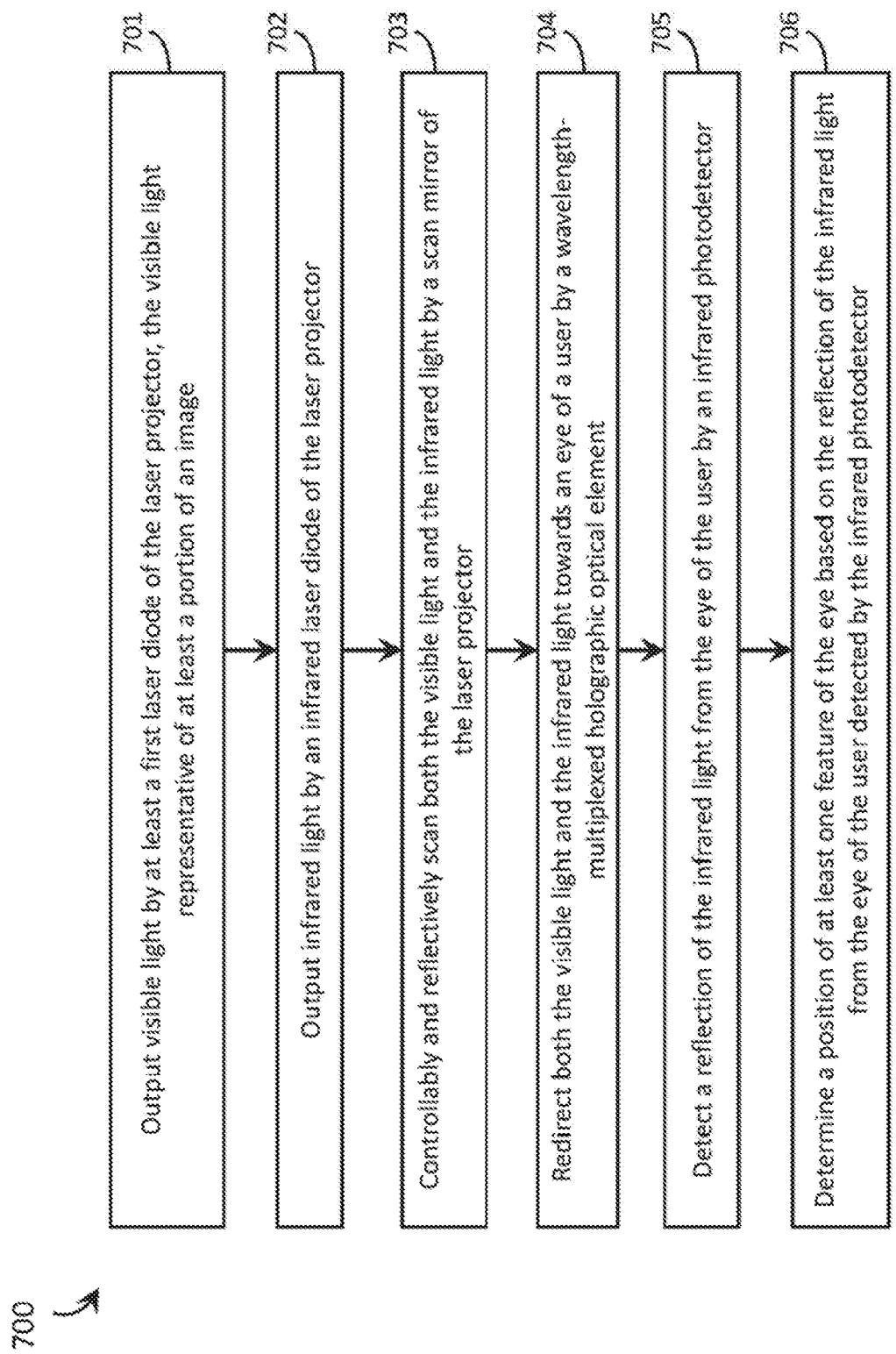
FIG. 7 is a flow-diagram showing a method of operating a laser projector to project an image to an eye of a user and to track the eye of the user in accordance with the present systems, devices, and methods.

FIG. 7 is a flow-diagram showing a method 700 of operating a laser projector to project an image to an eye of a user and to track the eye of the user in accordance with the present systems, devices, and methods. Method 700 includes six acts 701, 702, 703, 704, 705, and 706, though those of skill in the art will appreciate that in alternative embodiments certain acts may be omitted and/or additional acts may be added. Those of skill in the art will also appreciate that the illustrated order of the acts is shown for exemplary purposes only and may change in alternative embodiments.

For the purpose of method 700, the term "user" refers to a person that is observing an image projected by the laser projector.

At 701, at least a first laser diode of the laser projector outputs visible light. The visible light represents, embodies, or otherwise corresponds to at least a portion of an image. For example, the visible light may represent, embody, or otherwise correspond to a complete image or one or more pixels of an image. The visible light may include a complete modulated pattern of laser light (encoding a complete image), a portion of a modulated pattern of laser light, or only a single element of a modulated pattern of laser light. The laser projector may include a red laser diode, a green laser diode, and a blue laser diode and the visible light output at 701 may include red laser light output by the red laser diode, green laser light output by the green laser diode, blue laser light output by the blue laser diode, or any combination thereof.

At 702, an infrared laser diode of the laser projector outputs infrared light. Depending on the specific implementation, the infrared laser diode may or may not modulate to output a pattern of infrared laser light.

At 703, a scan mirror of the laser projector controllably and reflectively scans both the visible light (i.e., the visible light output by the laser projector at 701) and the infrared light (i.e., the infrared light output by the laser projector at 702).

At 704, a wavelength-multiplexed HOE receives both the visible light and the infrared light reflected from the scan mirror at 703 and the HOE redirects both the visible light and the infrared light towards the eye of the user. The visible light represents visual content being projected/displayed to the user while the infrared light is used for eye tracking purposes. As previously described, at least a first hologram of the wavelength-multiplexed HOE that is responsive to the wavelength(s) of the visible light and unresponsive to the infrared light may redirect the visible light towards the eye of the user and a second hologram of the wavelength-multiplexed HOE that is responsive to the infrared light and unresponsive to the wavelength(s) of the visible light may redirect the infrared light towards the eye of the user. In such implementations, the at least a first hologram of the wavelength-multiplexed HOE may, upon redirection of the visible light thereby or therefrom, apply a first optical power to the visible light, while the second hologram of the wavelength-multiplexed HOE may, upon redirection of the infrared light thereby of therefrom, apply a second optical power to the infrared light. The second optical power may be less than the first optical power. For example, the first optical power may be a positive optical power while the second optical power may be less than or equal to zero.

At 705, an infrared photodetector detects a reflection of at least a portion of the infrared light from the eye of the user. The intensity of the infrared light detected by the infrared photodetector may depend on the position, orientation, and/or movement of one or more feature(s) of the eye from which the infrared light is reflected.

At 706, a position of at least one feature of the eye is determined based on at least the reflection of at least a portion of the infrared light detected by the infrared photodetector at 705. The at least one feature of the eye may include, without limitation, a pupil, iris, cornea, or retinal blood vessel of the eye. In this context, the term "position" is used loosely to refer to the general spatial location and/or orientation of the at least one feature of the eye with respect to a reference point, such as the spatial location and/or orientation of the photodetector or a previously known spatial location and/or orientation of the at least one feature. Accordingly, the position of the at least one feature of the eye determined at 706 may be representative of (and/or used to subsequently determine) the position, orientation, and/or motion of the eye itself. In some implementations, the position of the at least one feature of the eye (and/or the corresponding position, orientation, and/or motion of the eye itself) may be determined by a processor in communication with the infrared photodetector.

In some implementations, multiple infrared photodetectors may be used to detect reflections of at least a portion (or portions) of the infrared light from the eye of the user, and the multiple infrared photodetectors may be physically clustered together or spatially separated around the support frame of a WHUD (e.g., around a perimeter of the HOE).

Where infrared light is used to illuminate all or a portion of the eye for eye tracking purposes, the full area of the eye may be completely illuminated via a full raster scan, or (since the projector is refreshing each frame quickly and full eye tracking can be spread out over multiple frames without noticeable delay to the user) portions of the eye may be illuminated in any of various patterns. For example, passive patterns such as a grid or set of parallel lines may be employed, or active patterns may be employed. Examples of active illumination patterns include: "binary style search" in which the area of the eye is divided into binary regions, the eye tracker determines which of the two regions contains a feature (e.g., the pupil or cornea), that region is subsequently divided into binary regions, and the process is continued with smaller and smaller regions until the position of the feature is identified with the desired resolution; "recent area focus" in which once a trusted eye position is found subsequent scans are limited to a subset of the full scan area that includes the position of the known eye position, with the subset being based on the likelihood of where the eye could possibly move within the time since the trusted eye position was identified; and/or "rotary scan" in which the area of the eye is divided into wedges or pie pieces which are scanned in succession.

The use of infrared light is advantageous because such light is readily distinguishable from the visible light provided by the laser projector. However, infrared light is also prevalent in the environment so a narrow waveband photodetector that is optimized to be responsive to infrared light may nevertheless detect environmental infrared noise. In order to help mitigate this effect (both in the infrared regime and in implementations in which visible light is used for eye tracking, e.g., as depicted in FIG. 4), laser light that is used for eye tracking purposes may be encoded in any of a variety of different ways to enable such light to be distinguished from environmental light of a similar wavelength. For example, narrow waveband light (infrared or visible) that is used for eye tracking purposes may be deliberately polarized and a corresponding polarization filter may be applied to the narrow waveband (e.g., infrared) photodetector so that the photodetector is only responsive to light that is in the narrow waveband and of the correct polarization. As another example, narrow waveband light that is used for eye tracking purposes may be modulated with a deliberate modulation pattern and light providing this pattern can be extracted from the intensity map provided by the photodetector during the signal processing and analysis of the photodetector output. In some implementations, an infrared filter may be applied to or otherwise integrated with the lens (transparent combiner) of a WHUD to block infrared light from the user's external environment from passing through the lens/transparent combiner and impinging on the eye of the user, so that the amount of environmental infrared light that is reflected from the eye and detected by an infrared photodetector is reduced.

As described previously, integrating infrared laser light into the SLP of a WHUD for eye tracking purposes may advantageously employ a HOE that is designed to impart a different optical function (e.g., optical power) on infrared laser light from the optical function that it imparts on the visible laser light.

Figure 8:
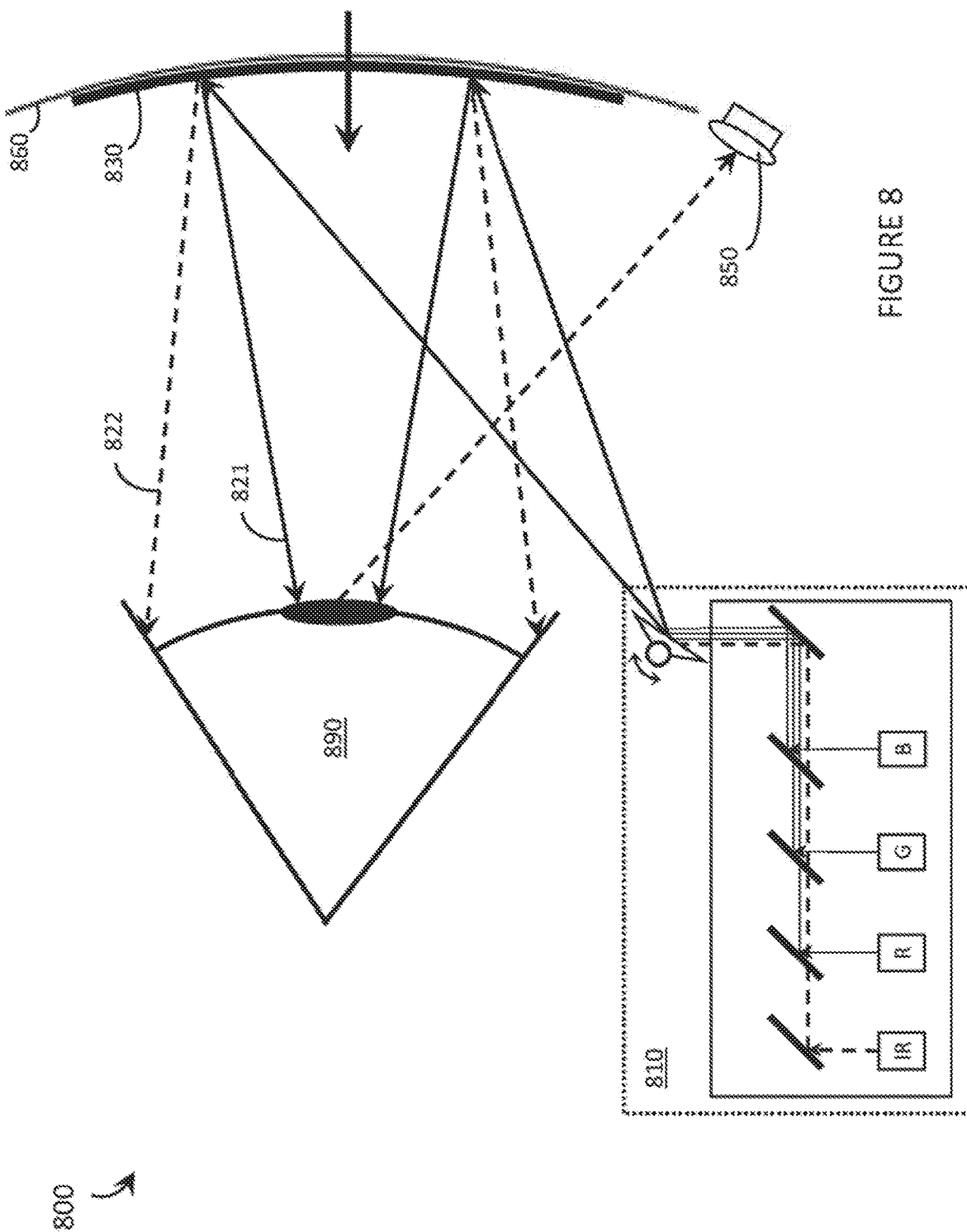
FIG. 8 is an illustrative diagram showing a side view of a wearable heads-up display that includes a multiplexed holographic optical element that enables both image projection and eye tracking functionality in accordance with the present systems, devices, and methods.

FIG. 8 is an illustrative diagram showing a side view of a WHUD 800 that includes a wavelength-multiplexed HOE 830 that enables both image projection and eye tracking functionality in accordance with the present systems, devices, and methods. WHUD 800 is substantially similar to WHUD 300 from FIG. 3 with some details of HOE 830 enhanced for the purpose of illustration. In brief, WHUD 800 includes a SLP 810 adapted to include an infrared laser diode (labeled as "IR" in FIG. 8) for eye tracking purposes and a transparent combiner comprising a wavelength-multiplexed HOE 830 integrated with (e.g., laminated or otherwise layered upon, or cast within) an eyeglass lens 860. Integration of HOE 830 with lens 860 may include and/or employ the systems, devices, and methods described in U.S. Provisional Patent Application Ser. No. 62/214,600 and/or U.S. Provisional Patent Application Ser. No. 62/268,892.

HOE 830 is wavelength-multiplexed to respond differently (i.e., apply a different optical power to) different wavelengths of light incident thereon. More specifically, HOE 830 is a heterogeneous HOE including at least a first hologram that applies a first optical power to light 821 having a first wavelength (e.g., at least a first visible wavelength) and a second hologram that applies a second optical power to light 822 having a second wavelength (e.g., an infrared wavelength). The second optical power is different from the first optical power and the second wavelength is different from the first wavelength. HOE 830 may include any number of layers of holographic material (e.g., photopolymer, a silver halide compound) carrying, encoding, containing, or otherwise including any number of holograms. A single layer of holographic material may include multiple holograms and/or individual holograms may be included on or in respective individual layers of holographic material.

In the illustrated example in FIG. 8, the "light having a first wavelength" and the "light having a second wavelength" respectively correspond to visible laser light 821 and infrared laser light 822, both output by SLP 810. SLP 810 outputs visible laser light 821 (represented by solid lines in FIG. 8) for the purpose of image projection and infrared laser light 822 (represented by dashed lines in FIG. 8) for the purpose of eye tracking. As examples, the visible laser light 821 may include light having at least one wavelength (e.g., red, green, or below; or any combination of red, green, and/or blue) in the range of about 390 nm to about 700 nm and the infrared laser light 822 may include light having at least one wavelength in the range of about 700 nm to about 10 um. Both visible laser light 821 and infrared laser light 822 are incident on wavelength-multiplexed HOE 830 and redirected thereby towards the eye 890 of a user of WHUD 800; however, because the requirements of image projection and eye tracking are different, wavelength-multiplexed HOE 830 redirects visible laser light 821 towards eye 890 in a different way from how wavelength-multiplexed HOE 830 redirects infrared laser light 822 towards eye 890. Wavelength-multiplexed HOE 830 includes i) at least a first hologram that is responsive to (i.e., redirects and applies a first optical power to) visible laser light 821 (i.e., light having at least a first wavelength in the visible spectrum) towards eye 890 and, and ii) a second hologram that is responsive to (i.e., redirects and applies a second optical power) infrared laser light 822 (i.e., light having a second wavelength in the infrared spectrum) towards eye 890. The first optical power (i.e., the optical power applied to the visible laser light 821 by at least a first hologram of wavelength-multiplexed HOE 830) is positive so that the at least a first hologram in wavelength-multiplexed HOE 830 causes the visible laser light 821 to converge to a first exit pupil at or near the eye 890 of the user. This convergence is advantageous to enable the user to see displayed content with a reasonable field of view. Because wavelength-multiplexed HOE 830 is integrated with lens 860, wavelength-multiplexed HOE 830 may be positioned proximate eye 890 and the first optical power may be relatively high (e.g., greater than or equal to about 40 diopters) in order to provide the necessary convergence. Concurrently, the second optical power (i.e., the optical power applied to the infrared laser light 822 by a second hologram of wavelength-multiplexed HOE 830) is less than the first optical power applied to the visible light by the at least a first hologram of wavelength-multiplexed HOE 830. The second optical power applied by the second hologram of wavelength-multiplexed HOE 830 may be positive and less than the first optical power applied by the at least a first hologram of wavelength-multiplexed HOE 830 (e.g., less than about 40 diopters; enough to reduce a divergence of, collimate, or converge) such that the infrared light 822 converges to an exit pupil that has a larger diameter at eye 890 than the exit pupil of the visible light 821. Alternatively, the second optical power applied by the second hologram may be zero or negative so that the second hologram of wavelength-multiplexed HOE 830 causes the infrared laser light 822 to redirect towards 890 without convergence (i.e., as from a plane mirror) or to diverge. In other words, the second optical power may be less than or equal to about 0 diopters. Providing a larger exit pupil for the infrared light 822 than the visible light 821 at eye 890 is advantageous to enable SLP 810 to illuminate the entire area of eye 890 with infrared laser light 822 for eye tracking purposes.

In accordance with the present systems, devices, and methods, the at least a first hologram in wavelength-multiplexed HOE 830 that is responsive to visible light may include any number of wavelength-multiplexed holograms, each of which may be responsive to a respective wavelength or respective range of wavelengths of visible light. For example, the at least a first hologram in wavelength-multiplexed HOE 830 that is responsive to visible light may include a red hologram that is responsive to red light provided by SLP 810, a green hologram that is responsive to green light provided by SLP 810, and/or a blue hologram that is responsive to blue light provided by SLP 810. Advantageously, each hologram that is responsive to visible light included in the at least a first hologram of wavelength-multiplexed HOE 830 may apply that same first optical power to the particular visible light to which the hologram is responsive.

The integration of eye tracking functionality in a WHUD that already employs a SLP and a holographic combiner for display purposes may, in accordance with the present systems, devices, and methods, be achieved by mostly discreetly adapting existing hardware components as opposed to adding the bulk of many new components. Specifically, i) an infrared laser diode may be to the SLP (the infrared diode modulated independently of the visible light diode(s) in the projector), ii) an infrared hologram may be added to the holographic combiner (the infrared hologram applying a lower optical power (including zero or negative optical power) to the infrared laser light in order to cover the entire eye area, in contrast to the relatively large optical power applied by the holographic combiner to the visible laser light), and iii) at least one infrared photodetector may be added to the WHUD to monitor reflections of the infrared laser light from the eye of the user.

As described previously, both the first hologram and the second hologram of wavelength-multiplexed HOE 830 may be included in or on a single layer of holographic material (e.g., film) or, alternatively, the first hologram may be included in or on a first layer of holographic material and the second hologram may be included in or on a second layer of holographic material. In the latter case, the first layer of holographic material and the second layer of holographic material may be laminated or otherwise layered together either directly or through any number of intervening layers/materials.

In some implementations, wavelength-multiplexed HOE 830 may include any number of additional holograms distributed over any number of layers. For example, wavelength-multiplexed HOE 830 may include a first hologram that is responsive to a red component of visible laser light 821, a second hologram that is responsive to infrared laser light 822, a third hologram that is responsive to a green component of visible laser light 821, and a fourth hologram that is responsive to a blue component of visible laser light 821. In this configuration, the first, third, and fourth holograms may each apply a same first optical power to the respective visible light to which each hologram is responsive and the second hologram may apply a second optical power to the infrared light.

The various embodiments described herein may be used for other sensing applications beyond eye tracking. For example, the high resolution and high sensitivity eye tracking enabled herein may be processed to extract subtle causes of eye movements, such as eye saccades and/or a user's heartbeat and/or a user's blood pressure.

One consequence to integrating eye tracking into a SLP is that the resulting eye tracking capability is only active when the SLP itself is active. In some situations, it may be desirable to provide a coarse eye tracking functionality even when the SLP is turned off. To this end, the various embodiments described herein (e.g., the configurations depicted in FIGS. 3, 4 and 5) may optionally include a separate eye tracking system (such as that depicted in FIG. 2) to enable the user to activate the SLP by glancing at one or more specific location(s). An example of a suitable coarse, supplemental, or second eye tracking system that may be combined in a WHUD employing the SLP-based eye tracking of the present systems, devices, and methods is described in U.S. Provisional Patent Application Ser. No. 62/281,041.

Throughout this specification and the appended claims, reference is often made to a "laser module," such as a laser projector (SLP or otherwise) comprising a laser module. Unless the specific context requires otherwise, the term "a laser module" should be interpreted loosely to mean "at least one laser module" and the various implementations described and claimed herein are generic to the number of distinct laser modules employed. For example, an SLP may employ a single laser module that includes any number of laser diodes, or a SLP may employ multiple laser modules (or a laser equivalent of a multi-chip module, such as a multi-chip laser module) that each include any number of laser diodes.

Throughout this specification and the appended claims, the term "about" is sometimes used in relation to specific values or quantities. For example, "light within a bandwidth of about 10 nm or less." Unless the specific context requires otherwise, the term about generally means ±15%.

The WHUDs described herein may include one or more sensor(s) (e.g., microphone, camera, thermometer, compass, and/or others) for collecting data from the user's environment. For example, one or more camera(s) may be used to provide feedback to the processor of the wearable heads-up display and influence where on the transparent display(s) any given image should be displayed.

The WHUDs described herein may include one or more on-board power sources (e.g., one or more battery(ies)), a wireless transceiver for sending/receiving wireless communications, and/or a tethered connector port for coupling to a computer and/or charging the one or more on-board power source(s).

Throughout this specification and the appended claims the term "communicative" as in "communicative pathway," "communicative coupling," and in variants such as "communicatively coupled," is generally used to refer to any engineered arrangement for transferring and/or exchanging information. Exemplary communicative pathways include, but are not limited to, electrically conductive pathways (e.g., electrically conductive wires, electrically conductive traces), magnetic pathways (e.g., magnetic media), and/or optical pathways (e.g., optical fiber), and exemplary communicative couplings include, but are not limited to, electrical couplings, magnetic couplings, and/or optical couplings.

Throughout this specification and the appended claims, infinitive verb forms are often used. Examples include, without limitation: "to detect," "to provide," "to transmit," "to communicate," "to process," "to route," and the like. Unless the specific context requires otherwise, such infinitive verb forms are used in an open, inclusive sense, that is as "to, at least, detect," to, at least, provide," "to, at least, transmit," and so on.

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art. The teachings provided herein of the various embodiments can be applied to other portable and/or wearable electronic devices, not necessarily the exemplary wearable electronic devices generally described above.

For instance, the foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs). However, those skilled in the art will recognize that the embodiments disclosed herein, in whole or in part, can be equivalently implemented in standard integrated circuits, as one or more computer programs executed by one or more computers (e.g., as one or more programs running on one or more computer systems), as one or more programs executed by on one or more controllers (e.g., microcontrollers) as one or more programs executed by one or more processors (e.g., microprocessors, central processing units, graphical processing units), as firmware, or as virtually any combination thereof, and that designing the circuitry and/or writing the code for the software and or firmware would be well within the skill of one of ordinary skill in the art in light of the teachings of this disclosure.

When logic is implemented as software and stored in memory, logic or information can be stored on any processor-readable medium for use by or in connection with any processor-related system or method. In the context of this disclosure, a memory is a processor-readable medium that is an electronic, magnetic, optical, or other physical device or means that contains or stores a computer and/or processor program. Logic and/or the information can be embodied in any processor-readable medium for use by or in connection with an instruction execution system, apparatus, or device, such as a computer-based system, processor-containing system, or other system that can fetch the instructions from the instruction execution system, apparatus, or device and execute the instructions associated with logic and/or information.

In the context of this specification, a "non-transitory processor-readable medium" can be any element that can store the program associated with logic and/or information for use by or in connection with the instruction execution system, apparatus, and/or device. The processor-readable medium can be, for example, but is not limited to, an electronic, magnetic, optical, electromagnetic, infrared, or semiconductor system, apparatus or device. More specific examples (a non-exhaustive list) of the computer readable medium would include the following: a portable computer diskette (magnetic, compact flash card, secure digital, or the like), a random access memory (RAM), a read-only memory (ROM), an erasable programmable read-only memory (EPROM, EEPROM, or Flash memory), a portable compact disc read-only memory (CDROM), digital tape, and other non-transitory media.

The various embodiments described above can be combined to provide further embodiments. To the extent that they are not inconsistent with the specific teachings and definitions herein, all of the U.S. patents, U.S. patent application publications, U.S. patent applications, foreign patents, foreign patent applications and non-patent publications referred to in this specification and/or listed in the Application Data Sheet which are owned by Thalmic Labs Inc., including but not limited to: U.S. Provisional Patent Application Ser. No. 62/167,767; U.S. Provisional Patent Application Ser. No. 62/271,135; U.S. Provisional Patent Application Ser. No. 62/017,089; U.S. Provisional Patent Application Ser. No. 62/053,598; U.S. Provisional Patent Application Ser. No. 62/117,316; U.S. Provisional Patent Application Ser. No. 62/134,347 (now U.S. Non-Provisional patent application Ser. No. 15/070,887); U.S. Provisional Patent Application Ser. No. 62/156,736; U.S. Provisional Patent Application Ser. No. 62/242,844; US Patent Publication No. 2015-0378164 A1; US Patent Publication No. 2015-0378161 A1; US Patent Publication No. 2015-0378162 A1; U.S. Non-Provisional patent application Ser. No. 15/145,576; U.S. Non-Provisional patent application Ser. No. 15/145,609; U.S. Non-Provisional patent application Ser. No. 15/145,583; U.S. Non-Provisional patent application Ser. No. 15/046,234; U.S. Non-Provisional patent application Ser. No. 15/046,254; U.S. Non-Provisional patent application Ser. No. 15/046,269; U.S. Provisional Patent Application Ser. No. 62/245,792; U.S. Provisional Patent Application Ser. No. 62/214,600; U.S. Provisional Patent Application Ser. No. 62/268,892; U.S. patent application Ser. No. 15/807,842; U.S. patent application Ser. No. 15/167,458; U.S. patent application Ser. No. 15/167,472; and U.S. Provisional Patent Application Ser. No. 62/281,041, are incorporated herein by reference, in their entirety. Aspects of the embodiments can be modified, if necessary, to employ systems, circuits and concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A wearable heads-up display ("WHUD") comprising:
an infrared light source to output an infrared light;
a visible light source to output a visible light;
a scan mirror aligned to receive the infrared light from the infrared light source and the visible light from the visible light source and to controllably reflect the infrared light and the visible light;
an optical splitter aligned to:
receive the infrared light from the scan mirror;
receive the visible light from the scan mirror;
transmit the infrared light therethrough without influencing the infrared light; and
separate the visible light into angle-separated copies;
a transparent combiner, the transparent combiner aligned to receive both the infrared light and the angle-separated copies of the visible light from the optical splitter and to redirect both the infrared light and the angle-separated copies of the visible light towards at least one eye of a user; and
an infrared detector aligned to receive at least a portion of infrared light reflected from the at least one eye of the user.

2. The WHUD of claim 1 wherein the transparent combiner comprises a holographic optical element ("HOE") aligned to receive the infrared light and the angle-separated copies of the visible light from the optical splitter and to redirect both the infrared light and the angle-separated copies of the visible light towards the at least one eye of the user, the HOE including:
a first hologram that is responsive to the angle separated copies of the visible light and unresponsive to the infrared light; and
a second hologram that is responsive to the infrared light and unresponsive to the angle separated copies of the visible light.

3. The WHUD of claim 1, further comprising a support frame which carries the infrared light source, the visible light source, the scan mirror, the optical splitter, the transparent combiner, and the infrared detector, wherein the support structure has a general shape and appearance of eyeglasses.

4. The WHUD of claim 1, wherein the optical splitter is at least partially formed of cold optical material.

5. The WHUD of claim 1, wherein each angle-separated copy of the visible light is a respective copy of the same image.

6. The WHUD of claim 1, wherein the optical splitter expands an eyebox of the WHUD.

7. The WHUD of claim 1 wherein:
the infrared light source comprises an infrared laser diode to output infrared laser light; and
the visible light source comprises at least one visible laser light diode to output visible laser light.

8. The WHUD of claim 7 wherein the at least one visible laser light diode includes at least one visible laser light diode selected from the group consisting of: a red laser diode, a green laser diode, a blue laser diode, and any combination of a red laser diode, a green laser diode, and/or a blue laser diode.

9. The WHUD of claim 1 wherein:
the transparent combiner applies a first optical power to the angle separated copies of visible light and the transparent combiner applies a second optical power to the infrared light, the second optical power different from the first optical power.

10. The WHUD of claim 9 wherein the first optical power is a positive optical power, and the second optical power is zero or a negative optical power to direct the infrared light over an entirety of at least one eye of the user.

11. A method of projecting an image to an eye of a user and tracking the eye of the user, the method comprising:
outputting, by an infrared light source, an infrared light;
outputting, by a visible light source, a visible light;
receiving, by a scan mirror, the infrared light and the visible light;
controllably reflecting, by the scan mirror, the infrared light and the visible light towards an optical splitter;
receiving, by the optical splitter, the infrared light from the scan mirror;
receiving, by the optical splitter, the visible light from the scan mirror;
transmitting, by the optical splitter, the infrared light without influencing the infrared light;
separating, by the optical splitter, the visible light into angle-separated copies;
receiving, by a transparent combiner, both the infrared light and the angle-separated copies of the visible light from the optical splitter;
redirecting, by the transparent combiner, both the infrared light and the angle-separated copies of the visible light towards at least one eye of a user; and
receiving, by an infrared detector, at least a portion of infrared light reflected from the at least one eye of the user.

12. The method of claim 11 wherein:
outputting, by an infrared light source, an infrared light comprises outputting, by an infrared laser diode, infrared laser light; and
outputting, by a visible light source, a visible light comprises outputting, by at least one visible laser light diode, visible laser light.

13. The method of claim 12 wherein outputting, by at least one visible laser light diode, visible laser light includes at least one or any combination of:
outputting, by a red laser diode, red laser light;
outputting, by a green laser diode, green laser light; and
outputting, by a blue laser diode, blue laser light.

14. The method of claim 11 further comprising:
applying, by the transparent combiner, a first optical power to the angle separated copies of visible light; and
applying, by the transparent combiner, a second optical power to the infrared light, the second optical power different from the first optical power.

15. The method of claim 14 wherein:
applying, by the transparent combiner, a first optical power to the angle separated copies of visible light comprises applying, by the transparent combiner, a positive optical power to the angle separated copies of visible light; and
applying, by the transparent combiner, a second optical power to the infrared light comprises applying, by the transparent combiner, a zero or a negative optical power to the infrared light to direct the infrared light over an entirety of at least one eye of the user.

\* \* \* \* \*